US007317898B2

(12) United States Patent
Tegreene

(10) Patent No.: US 7,317,898 B2
(45) Date of Patent: Jan. 8, 2008

(54) MOTE NETWORKS USING DIRECTIONAL ANTENNA TECHNIQUES

(75) Inventor: Clarence T. Tegreene, Bellevue, WA (US)

(73) Assignee: Searete LLC, Bellevue, WA (US)

( * ) Notice: Subject to any disclaimer, the term of this patent is extended or adjusted under 35 U.S.C. 154(b) by 329 days.

(21) Appl. No.: 10/814,454

(22) Filed: Mar. 31, 2004

(65) Prior Publication Data

US 2005/0221761 A1 Oct. 6, 2005

(51) Int. Cl.
*H04B 15/00* (2006.01)

(52) U.S. Cl. ................. 455/63.4; 455/41.2; 455/562.1; 342/367; 342/371

(58) Field of Classification Search ............... 455/63.4, 455/25, 41.2, 562.1; 342/367–368, 371–375
See application file for complete search history.

(56) References Cited

U.S. PATENT DOCUMENTS

| | | | |
|---|---|---|---|
| 5,432,519 | A | 7/1995 | Sezai |
| 5,581,694 | A | 12/1996 | Iverson et al. |
| 5,615,367 | A | 3/1997 | Bennett et al. |
| 5,697,066 | A | 12/1997 | Acampora |
| 6,088,665 | A | 7/2000 | Burns et al. |
| 6,124,806 | A | 9/2000 | Cunningham et al. |
| 6,131,119 | A | 10/2000 | Fukui |
| 6,208,247 | B1 | 3/2001 | Agre et al. |
| 6,229,486 | B1 | 5/2001 | Krile |
| 6,296,205 | B1 | 10/2001 | Hanson et al. |
| 6,344,797 | B1 | 2/2002 | Hosny |
| 6,421,354 | B1 | 7/2002 | Godlewski |
| 6,504,829 | B1 | 1/2003 | Young et al. |
| 6,505,205 | B1 | 1/2003 | Kothuri et al. |
| 6,618,745 | B2 | 9/2003 | Christensen et al. |
| 6,640,087 | B2 | 10/2003 | Reed et al. |
| 6,640,145 | B2 | 10/2003 | Hoffberg et al. |
| 6,704,742 | B1 | 3/2004 | Huth et al. |
| 6,778,844 | B2 | 8/2004 | Hood, III |
| 6,792,321 | B2 | 9/2004 | Sepe, Jr. |
| 6,826,162 | B2 | 11/2004 | Haines et al. |
| 6,888,453 | B2 | 5/2005 | Lutz et al. |
| 6,943,747 | B2 | 9/2005 | Kwon |
| 6,950,778 | B2 | 9/2005 | Warner et al. |
| 7,016,812 | B2 | 3/2006 | Aritsuka et al. |
| 7,103,511 | B2 | 9/2006 | Petite |
| 7,165,109 | B2 | 1/2007 | Chiloyan et al. |
| 7,167,859 | B2 | 1/2007 | Shah et al. |
| 2001/0027495 | A1 | 10/2001 | Campagnolo |
| 2002/0027504 | A1 | 3/2002 | Davis et al. |
| 2002/0036595 | A1 | 3/2002 | Chiang et al. |
| 2002/0040639 | A1 | 4/2002 | Duddleson et al. |
| 2002/0095501 | A1 | 7/2002 | Chiloyan et al. |
| 2002/0095568 | A1 | 7/2002 | Norris |
| 2002/0123864 | A1 | 9/2002 | Eryurek et al. |
| 2002/0161751 | A1 | 10/2002 | Mulgund et al. |

(Continued)

OTHER PUBLICATIONS

Zhao, Feng; Guibas, Leonidas J.; *Wireless Sensor Networks: An Information Processing Approach*. San Francisco: Morgan Kaufmann Publishers-Elsevier Inc., bearing a copyright date of 2004.

(Continued)

*Primary Examiner*—Lee Nguyen

(57) ABSTRACT

A mote network having and/or using one or more directional antennas.

42 Claims, 18 Drawing Sheets

U.S. PATENT DOCUMENTS

2003/0026268 A1 2/2003 Navas
2003/0033394 A1 2/2003 Stine
2003/0135495 A1 7/2003 Vagnozzi
2003/0151513 A1 8/2003 Herrmann et al.
2003/0172221 A1 9/2003 McNeil
2003/0222818 A1* 12/2003 Regnier et al. ............. 342/383
2003/0228857 A1* 12/2003 Maeki ..................... 455/278.1
2003/0236866 A1 12/2003 Light
2004/0005889 A1 1/2004 Nishimura et al.
2004/0008140 A1* 1/2004 Sengupta et al. .... 343/700 MS
2004/0010492 A1 1/2004 Zhao et al.
2004/0090326 A1 5/2004 Chin et al.
2004/0122849 A1 6/2004 Nelson
2004/0137915 A1 7/2004 Diener et al.
2004/0218602 A1 11/2004 Hrastar et al.
2004/0230638 A1 11/2004 Balachandran et al.
2004/0249563 A1 12/2004 Otsuki et al.
2005/0021724 A1 1/2005 Kung et al.
2005/0062653 A1 3/2005 Cetiner et al.
2005/0141706 A1 6/2005 Regli et al.
2005/0143133 A1* 6/2005 Bridgelall ................ 455/562.1
2006/0136627 A1 6/2006 Maity et al.
2006/0212570 A1 9/2006 Aritsuka et al.
2006/0224434 A1 10/2006 Rumi et al.

OTHER PUBLICATIONS

Berkely Webs: Wireless Embedded Systems, "Building Sensor Networks with TinyOS" May 5, 2003 Mobisys Tutorial, San Francisco Powerpoint Presentation, Culler, David; Levis, Phil; Szewczyk, Rob; Polastre, Joe; pp. 1-41 located at http://webs.cs.berkeley.edu, printed on Apr. 15, 2004.

Berkely Webs: Wireless Embedded Systems, "Publications", pp. 1-3, located at http://webs.cs.berkeley.edu/publications.html, printed on Apr. 12, 2004.

Berkeley Webs: Wireless Embedded Systems, "Tiny OS a component-based OS for the networked sensor regime", "Latest News", pp. 1-2 located at http://webs.cs.berkeley.edu/tos/, printed on Jan. 27, 2004.

Berkeley Webs: Wireless Embedded Systems, "Tiny OS a component-based OS for the networked sensor regime", "Publications/Presentations", pp. 1-3 located at http://www.tinyos.net/media.html, printed on Apr. 13, 2004.

Berkeley Webs: Wireless Embedded Systems, "Tiny OS a component-based OS for the networked sensor regime", "Related UC Berkeley Work", pp. 1-9 located at http://webs.cs.berkeley.edu/tos/related.html, printed on Jan. 27, 2004.

Berkeley Webs: Wireless Embedded Systems, "Tiny OS Tutorial Index", pp. 1-2 located at http://webs.cs.berkeley.edu/tos/tinyos-l.x/doc/tutorial/index.html, printed on Apr. 15, 2004.

Berkeley Webs: Wireless Embedded Systems, "Tiny OS Tutorial Lesson 8: Data Logging Application", pp. 1-4 located at http://webs.cs.berkeley.edu/tos/tinyos-l.x/doc/tutorial/lesson8.html, printed on Apr. 15, 2004.

Center for the Built Environment, "XYZ On A Chip: Integrated Wireless Sensor Networks for the Control of the Indoor Environment in Buildings" pp. 1-2, located at http://www.cbe.berkeley.edu/research/briefs-wirelessxyz.htm, bearing a date of 2002, printed on Jan. 27, 2004.

Citris, "Brainy Buidings Conserve Energy" p. 1-3 located at http://www.citris.berkeley.edu/applications/energy/smartbuildings.html, printed on Jan. 27, 2004.

Citris, "The Real World as One Giant Database" pp. 1-3 located at http://www.citris.berkeley.edu/newsletter/2003_Newsletters/december_2003/feature.htm, bearing a date of 2003, printed on Apr. 9, 2004.

"Data Repository", University of California Berkeley, located at http://localization.millennium.berkeley.edu/data_repository.html, pp. 1 of 1, bearing a date of 2001, printed on Apr. 7, 2004.

Gelsinger, Pat; Intel.com, "Expanding Moore's Law with Convergance" pp. 1-4 located at http://www.intel.com/labs/features/em101031.htm, printed on Apr. 9, 2004.

Intel.com, "New Computing Frontiers-The Wireless Vineyard" pp. 1-4 located at http://www.intel.com/labs/features/rs01031.htm, printed on Apr. 7, 2004.

ISIS NEST: Institute For Software Integrated Systems; "NEST Home: Network Embedded Systems Technology", pp. 1-2, located at http://www.isis.vanderbilt.edu/projects.nest/index.html, printed on Apr. 14, 2004.

ISIS NEST: Institute For Software Integrated Systems; "Applications: Shooter Localizations", pp. 1-5, located at http://www.isis.vanderbilt.edu/projects.nest/applications.html, printed on Apr. 14, 2004.

ISIS NEST: Institute For Software Integrated Systems; "Middleware: Next Middleware Services", pp. 1 of 1, located at http://www.isis.vanderbilt.edu/projects.nest/middleware.html, printed on Apr. 14, 2004.

ISIS NEST: Institute For Software Integrated Systems; "Tools: NEST Tools", pp. 1 of 1 located at http://www.isis.vanderbilt.edu/projects.nest/tools.html, printed on Apr. 14, 2004.

ISIS NEST: Institute For Software Integrated Systems; "Documents: NEST Documents", pp. 1-2, located at http://www.isis.vanderbilt.edu/projects.nest/documents.html, printed on Apr. 14, 2004.

ISIS NEST: Institute For Software Integrated Systems; "Download: NEST Download", pp. 1-2, located at http://www.isis.vanderbilt.edu/projects.nest/download.html, printed on Apr. 14, 2004.

ISIS NEST: Institute For Software Integrated Systems; "People: The NEST Group", pp. 1 of 1, located at http://www.isis.vanderbilt.edu/projects.nest/people.html, printed on Apr. 14, 2004.

Johnson, R. Colin, "Companies test prototype wireless-sensor nets" EE Times, pp. 1-3, printable version of article located at http://www.eet.com/article/showArticle.jhtml?articleID=9900910, bearing a date of Jan. 29, 2003, printed on Jan. 27, 2004.

Kahn, Kevin C.; Culler, David E.; "Ad Hoc Sensor Networks A New Frontier for Computing Applications" bearing a date of Apr. 2002, printed on Apr. 9, 2004.

Kling, Ralph, "Intel® Resaerch Mote" pp. 1-13, Powerpoint Presentation, located at http://webs.cs.berkeley.edu/retreat-1-03/slides/imote-nest-q103-03-dist.pdf, Intel Corporation Research, Santa Clara, CA, printed on Apr. 13, 2004.

Levis, Philip; Culler, David; "Maté: A Tiny Virtual Machine for Sensor Networks", pp. 1-11, printed on Apr. 12, 2004.

Levis, Philip; Madden, Sam; Gay, David; Polastre, Joseph; Szewczyk, Robert; Woo, Alec; Brewer, Eric; Culler, David; "The Emergence of Networking Abstractions and Techniques in TinyOS" pp. 1-14, printed on Apr. 13, 2004.

Levis, Philip; Patel, Neil; Culler, David; Shenker, Scott; "Trickle: A Self-Regulating Algorithm for Code Propagation and Maintenance in Wireless Sensor Networks", printed on Apr. 13, 2004.

Levis, Philip; Patel, Neil; "Maté: Building Application-Specific Sensor Network Language Runtimes", bearing a date of Nov. 11, 2003, printed on Apr. 12, 2004.

"Localization Distributed Embedded Systems" UCLA Computer Science 213: Localization Systems Powerpoint Presentation, pp. 1-61, bearing a course name of: CS 213/Estrin/Winter 2003, bearing a speaker name of: Lewis Girod, bearing a date of Feb. 4, 2003, printed on Mar. 15, 2004.

"Localization.Millennium.Berkeley.Edu", University of California Berkeley, located at http://localization.millennium.berkeley.edu/introduction.html, pp. 1 of 1, bearing a date of 2001, printed on Apr. 7, 2004.

"Localization Standards", University of California Berkeley, located at http://localization.millennium.berkeley.edu/localization_standards.html, pp. 1 of 1, bearing a date of 2001, printed on Apr. 7, 2004.

Maróti, Miklós; Vólgyesi, Péter; Simon, Gyula; Karsai, Gábor; Lédeczi, Akos; "Distributed Middleware Services Composition and Synthesis Technology"; pp. 1-8, IEEE, bearing a date of 2002, printed on Apr. 14, 2004.

Pescovitz, David, "Robugs: Smart Dust Has Legs" pp. 1-2, located at http://www.coe.berkeley.edu/labnotes/0903/pister_print.html, bearing a date of Sep. 2003, printed on Apr. 9, 2004.
Raghunathan, Vijay; Schurgers, Curt; Park, Sung; Srivastava, Mani B.; "Energy Aware Wireless Sensor Networks" pp. 1-17; Department of Electrical Engineering, University of California, Los Angeles; printed on Mar. 15, 2004.
Savvides, Andreas; "Hardware", pp. 1-3, located at http://nesl.ee.ucle.edu/projects/ahlos/hardware.htm, Networks and Embedded Systems Lab, University of California, Los Angeles; bearing a date of Jan. 18, 2003, printed on Feb. 23, 2004.
Savvides, Andreas; "Localization Forum", pp. 1 of 1, located at http://nesl.ee.ucla.edu/projects/ahlos/localization_forum.htm, Networks and Embedded Systems Lab, University of California, Los Angeles; bearing a date of Dec. 24, 2003, printed on Feb. 23, 2004.
"The Ad-Hoc Localization System (AHLoS)" Networks and Embedded Systems Lab, University of California, Los Angeles; located at http://nesl.ee.ucla.edu/projects/ahlos/Default.htm, pp. 1-4, printed on Feb. 23, 2004.
"Tiny DB A Declarative Database for Sensor Networks" pp. 1-2, located at http://telegraph.cs.berkeley.edu/tinydb/ printed on Apr. 9, 2004.
Tiny Sec: Link Layer Security For Tiny Devices, "Calamari: A localization system for sensor networks", pp. 1-6, located at http://www.cs.berkeley.edu/~kamin/calamari/ printed on Apr. 12, 2004.
Buonadonna, Phillip; Hill, Jason; Culler, David; "Active Message Communication for Tiny Networked Sensors," pp. 1-11, printed on Mar. 8, 2004.
Gay, David; Levis, Phil; Von Behren; Welsh, Matt; Brewer, Eric; and Culler, David, "The nesCLanguage: a Holistic Approach to Network Embedded Systems," pp. 1-10; Intel Research Berkeley, The Intel Corporation, Nov. 2002.
Hill, Jason; Szewczyk, Robert; Woo, Alec; Hollar, Seth; Culler, David; Pister, Kristofer, "System Architecture Directions for Networked Sensors," ASPLOS 2000, Cambridge, Nov. 2000.
Intel.com, "Exploratory Research Deep Networking" pp. 1-10 located at http://www.intel.com/research/exploratory/heterogenerous.htm, printed on Mar. 25, 2004.
Levis, Philip, "Viral Code Propagation in Wireless Sensor Networks," EECS Department, University of California at Berkeley, printed on Mar. 8, 2004.
Liscano, Ramiro, "Service Discovery in Sensor Networks: An Overview" Powerpoint Presentation; pp. 1-51; School of Information Technology and Engineering, University of Ottawa, Canada, bearing a date of 2003, printed on Mar. 8, 2004.
Madden, Samuel, "Acquisitional Query Processing in TinyDB" Powerpoint Presentation, pp. 1-51; NEST Winter Retreat 2003, printed on Mar. 8, 2004.
Madden, Samuel, "Challenges in Sensor Network Query Processing" Powerpoint Presentation at the Jan. 15, 2002 NEST Retreat, printed on Mar. 8, 2004.
Madden, Samuel; Szewczyk, R.; Franklin, Michael; and Culler, David "Supporting Aggregate Queries Over Ad-Hoc Wireless Sensor Networks," pp. 1-10, printed on Mar. 8, 2004.
Madden, Samuel; Szewczyk, R.; Franklin, Michael; Culler, David "Supporting Aggregate Queries Over Ad-Hoc Wireless Sensor Networks" Powerpoint Presentation, pp. 1-47, 4th IEEE Workshop on Mobile Computing, dated Jun. 21, 2002.
Madden, Samuel; Franklin, Michael J.; Hellerstein, Joseph; M., and Hong, Wei, "The Design of an Acquisitional Query Processor for Sensor Networks," pp. 1-14, SIGMOD, Jun. 2003.
Ryer, Alex; *Light Measurement Handbook*, http://www.intl-light.com/handbook; pp. 1-64, copyright 1997, printed on Mar. 8, 2004.
SearchMobileComputing.com, "Ad-Hoc Network" pp. 1-3 located at http://searchmobilecomputing.techtarget.com/sDefinition/0,,sid40_gci213462,00.html, bearing a date of Apr. 11, 2003, printed on Mar. 8, 2004.
SearchNetworking.com Definitions, "Jini" pp. 1-3 located at http://searchnetworking.techtarget.com/sDefinition/0,,sid7_gci212422,00.html, bearing a date of Apr. 10, 2003, printed on Mar. 8, 2004.
Spyropoulos, Akis; Raghavendra, C.S., "Energy Efficient Communications in Ad Hoc Networks Using Directional Antennas," Dept. of Electrical Engineering-Systems, University of Southern California, bearing a date of 2002, printed on Feb. 23, 2004.
Viswanath, Kumar, "Adaptive, Integrated Multicast Routing for Group Communications in ad-Hoc Networks" Powerpoint Presentation, pp. 1-12; Computer Engineering Department, University of California, Santa Cruz, printed on Mar. 8, 2004.
Woo, Alec; Tong, Terence; and Culler, David, "Taming the Underlying Challenges of Reliable Multihop Routing in Sensor Networks," pp. 1-4, SenSys '03, Nov. 5-7, 2003, Los Angeles, California, USA.
Adler, Robert et al.; "Demo Abstract: Intel Mote 2: An Advanced Platform for Demanding Sensor Network Applications"; Intel Corporation; bearing dates of Nov. 2-4, 2005; p. 298; (plus cover sheet).
Dutta, Prabal K. et al.; "System Software Techniques for Low-Power Operation in Wireless Sensor Networks"; Computer Science Division, University of California, Berkeley; bearing a date of 2005; pp. 924-931; (plus cover sheet).
Krause, Andreas et al.; "Near-optimal Sensor Placements: Maximizing Information while Minimizing Communication Cost"; bearing dates of Apr. 19-21, 2006; pp. 2-10; (plus cover sheets).
Lu, Jie et al.; "User Modeling for Full-Text Federated Search in Peer-to-Peer Networks"; Language Technologies Institute, Carnegie Mellon University; bearing dates of Aug. 6-11, 2006; pp. 332-339; (plus cover sheet).
Nachman, Lama et al.; "The Intel® Mote Platform: A Bluetooth*-Based Sensor Network for Industrial Monitoring"; Corporate Technology Group, Intel Corporation; bearing a date of 2005; pp. 1-6; (plus cover sheet).
PCT International Search Report; International App. No.: PCT/US05/11202; Sep. 27, 2006.
PCT International Search Report; International App. No.: PCTUS05/10054; Dec. 1, 2006.
Razeeb, Kafil M. et al.; "A Hybrid Network of Autonomous Sensor Nodes"; NMRC, University College Cork; bearing dates of Nov. 8-10, 2004; pp. 69-70; (plus cover sheet).
Sharifzadeh, Mehdi et al.; "Supporting Spatial Aggregation in Sensor Network Databases*"; Computer Science Department, University of Southern California; bearing dates of Nov. 12-13, 2004; pp. 166-175; (plus cover sheet).
U.S. Appl. No. 11/728,719, Clarence T. Tegreene.
U.S. Appl. No. 11/731,734, Clarence T. Tegreene.
Culler, David; Estrin, Deborah; Srivastava, Mani; "Overview of Sensor Networks"; Computer; Aug. 2004; pp. 41-49; vol. 37; No. 8; IEEE Computer Society.
Culler, David E.; Mulder, Hans; "Smart Sensors To Network The World"; Scientific American; printed on Jun. 26, 2007; pp. 1-10; http://www.intel.com/research/exploratory/smartnetworks.htm.
Fall, Kevin; "A Delay-Tolerant Network Architecture For Challenged Internets"; Intel Research Berkeley; Feb. 26, 2003; pp. 1-14; ACM Press.
Govindan, Ramesh; Kohler, Eddie; Estrin, Deborah; Bian, Fang; Chintalapudi, Krishna; Gnawali, OM; Gummadi, Ramakrishna; Rangwala, Sumit; Stathopoulos, Thanos; "Tenet: An Architecture For Tiered Embedded Networks"; pp. 1-8.
Stathopoulos, Thanos; Girod, Lewis; Heidemann, John; Estrin, Deborah; "More Herding For Tiered Wireless Sensor Networks"; Center For Embedded Networked Sensing; pp. 1-14; UCLA, Department of Computer Science / USC, Information Sciences Institute.
Lu, Jie; Callan, Jamie; "Content-Based Retrieval In Hybrid Peer-To-Peer Networks"; Information Retrieval Session 4: General Retrieval Issues; 2003; pp. 199-206; ACM Press.
PCT International Search Report; International App. No.: PCT/US05/10843; Mar. 29, 2005.
PCT International Search Report; International App. No.: PCT/US05/09479; Jul. 17, 2007.
PCT International Search Report; International App. No.: PCT/US05/09640; Jul. 9, 2007.
PCT International Search Report; International App. No.: PCT/US05/10053; Aug. 10, 2007.

Woo, Alec; Culler, David E.; "A Transmission Control Scheme for Media Access in Sensor Networks"; bearing a date of Jul. 2001; pp. 1-15; located at: http://www.cs.berkeley.edu/~awoo/awoo_mobicom.pdf.
U.S. Appl. No. 10/909,200, Jung et al.
U.S. Appl. No. 10/903,692, Jung et al.
U.S. Appl. No. 10/903,652, Jung et al.
U.S. Appl. No. 10/900,163, Jung et al.
U.S. Appl. No. 10/900,147, Jung et al.
U.S. Appl. No. 10/882,119, Jung et al.
U.S. Appl. No. 10/877,109, Jung et al.
U.S. Appl. No. 10/877,099, Jung et al.
U.S. Appl. No. 10/850,914, Jung et al.
U.S. Appl. No. 10/844,614, Jung et al.
U.S. Appl. No. 10/844,613, Jung et al.
U.S. Appl. No. 10/844,612, Jung et al.
U.S. Appl. No. 10/844,564, Jung et al.
U.S. Appl. No. 10/843,987, Jung et al.
PCT International Search Report; International App. No. PCT/US 05/09641; 5 pages; Sep. 13, 2007.

* cited by examiner

MOTE NETWORKS USING DIRECTIONAL ANTENNA TECHNIQUES

CROSS-REFERENCE TO RELATED APPLICATIONS

The present application is related to, claims the earliest available effective filing date(s) from the following listed application(s) (the “Related Applications”) (e.g., claims earliest available priority dates for other than provisional patent applications or claims benefits under 35 USC § 119(e) for provisional patent applications), and incorporates by reference in its entirety all subject matter of the following listed application(s) to the extent such subject matter is not inconsistent herewith; the present application also claims the earliest available effective filing date(s) from, and also incorporates by reference in its entirety all subject matter of any and all parent, grandparent, great-grandparent, etc. applications of the “Related Application(s)”.

RELATED APPLICATIONS

1. For purposes of the USPTO extra statutory requirements, the present application constitutes a continuation-in-part of U.S. patent application Ser. No. 10/816,375 entitled MOTE-ASSOCIATED INDEX CREATION, naming Edward K. Y. Jung and Clarence T. Tegreene as inventors, filed 31 Mar. 2004, which is currently co-pending or is an application of which a currently co-pending application is entitled to the benefit of the filing date.
2. For purposes of the USPTO extra statutory requirements, the present application constitutes a continuation-in-part of U.S. patent application Ser. No. 10/816,082 entitled TRANSMISSION OF MOTE-ASSOCIATED INDEX DATA, naming Edward K. Y. Jung and Clarence T. Tegreene as inventors, filed 31 Mar. 2004, which is currently co-pending or is an application of which a currently co-pending application is entitled to the benefit of the filing date.
3. For purposes of the USPTO extra statutory requirements, the present application constitutes a continuation-in-part of U.S. patent application Ser. No. 10/816,358 entitled AGGREGATING MOTE-ASSOCIATED INDEX DATA, naming Edward K. Y. Jung and Clarence T. Tegreene as inventors, filed 31 Mar. 2004, which is currently co-pending or is an application of which a currently co-pending application is entitled to the benefit of the filing date.
4. For purposes of the USPTO extra statutory requirements, the present application constitutes a continuation-in-part of U.S. patent application Ser. No. 10/816,102 entitled TRANSMISSION OF AGGREGATED MOTE-ASSOCIATED INDEX DATA, naming Edward K. Y. Jung and Clarence T. Tegreene as inventors, filed 31 Mar. 2004, which is currently co-pending or is an application of which a currently co-pending application is entitled to the benefit of the filing date.
5. For purposes of the USPTO extra statutory requirements, the present application constitutes a continuation-in-part of U.S. patent application Ser. No. 10/816,364 entitled FEDERATING MOTE-ASSOCIATED INDEX DATA, naming Edward K. Y. Jung and Clarence T. Tegreene as inventors, filed 31 Mar. 2004, which is currently co-pending or is an application of which a currently co-pending application is entitled to the benefit of the filing date.

6. For purposes of the USPTO extra statutory requirements, the present application constitutes a continuation-in-part of U.S. patent application Ser. No. 10/813,967 entitled MOTE NETWORKS HAVING DIRECTIONAL ANTENNAS naming Clarence T. Tegreene as inventor, filed 31 Mar. 2004, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter “Applicant”) has provided above a specific reference to the application(s) from which priority is being claimed as recited by statute. Applicant understands that the statute is unambiguous in its specific reference language and does not require either a serial number or any characterization, such as “continuation” or “continuation-in-part,” for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application is related, in general, to mote systems and/or mote methods.

SUMMARY

In one aspect a mote method includes but is not limited to: adjusting a field of regard of a first-mote directional antenna; monitoring one or more indicators of a received signal strength of the first-mote directional antenna signal; and determining a direction associated with a second mote in response to the monitored one or more indicators of the received signal strength of the first-mote directional antenna. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect a mote method includes but is not limited to: adjusting a beam of a second-mote directional antenna; and transmitting a signal over the beam of the second-mote directional antenna. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect a mote method includes but is not limited to: adjusting a field of regard of a first-mote directional antenna in response to a direction associated with a second-mote directional antenna; and at least one of transmitting a signal from the first-mote directional antenna or receiving a signal from the first-mote directional antenna. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect a mote method includes but is not limited to: detecting an initiation signal; and initiating at least one of said adjusting a beam of a second-mote directional antenna or said transmitting a signal over the beam of the second-mote directional antenna, in response to said detecting. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect a mote method includes but is not limited to: adjusting a field of regard of a first-mote directional antenna in response to a direction associated with a second-mote directional antenna; and at least one of transmitting a signal from the first-mote directional antenna or receiving a signal from the first-mote directional antenna. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined by the claims, will become apparent in the detailed description set forth herein.

BRIEF DESCRIPTION OF THE FIGURES

The use of the same symbols in different drawings typically indicates similar or identical items.

DETAILED DESCRIPTION

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

I. Device(s) and/or System(s)

Figure 1:
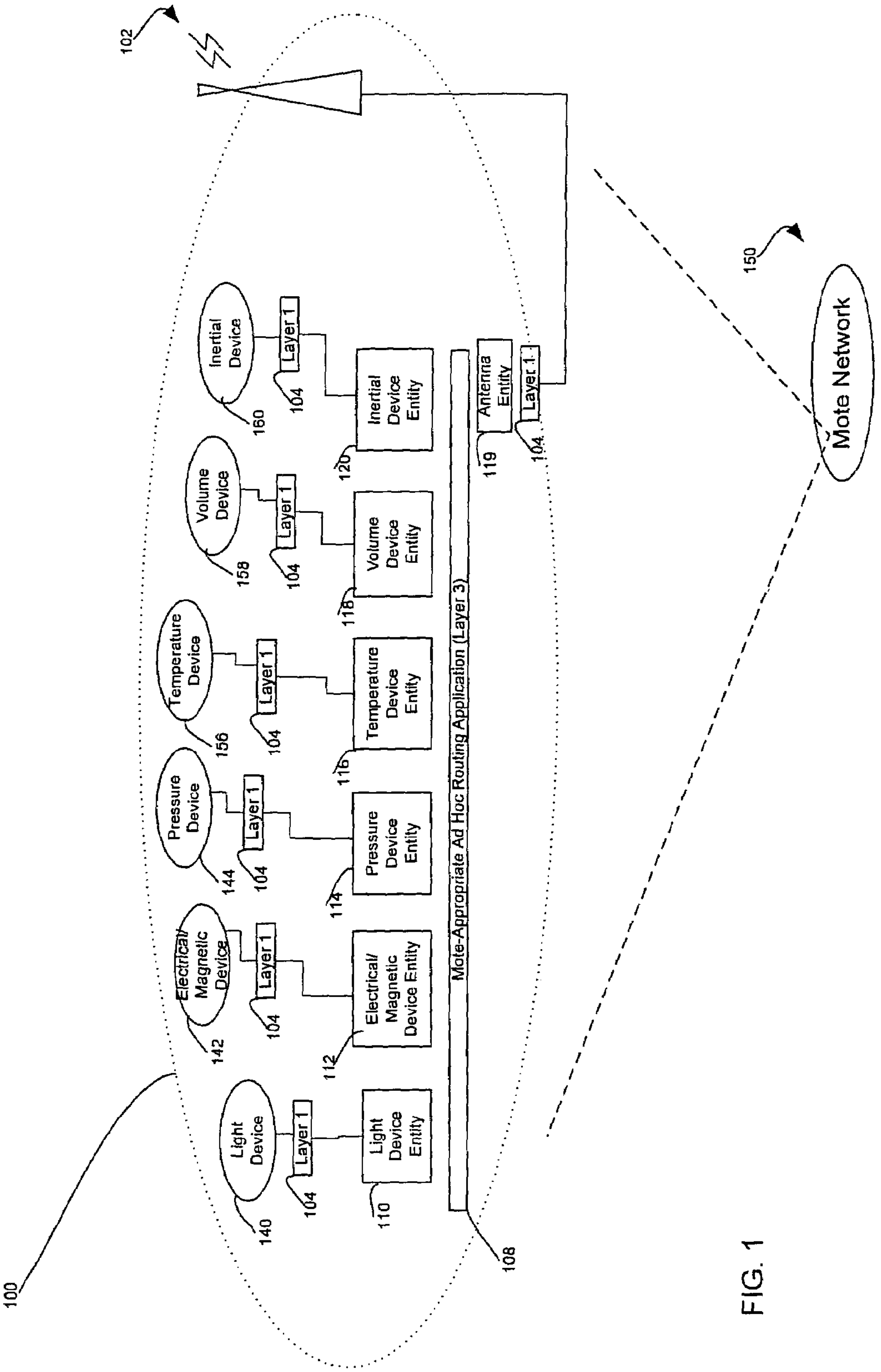
FIG. 1 shows an example of mote 100 of mote-appropriate network 150 that may serve as a context for introducing one or more processes and/or devices described herein.

With reference now to FIG. 1, shown is an example of mote 100 of mote-appropriate network 150 that may serve as a context for introducing one or more processes and/or devices described herein. A mote is typically composed of sensors, actuators, computational entities, and/or communications entities formulated, in most cases at least in part, from a substrate. As used herein, the term "mote" typically means a semi-autonomous computing, communication, and/or sensing device as described in the mote literature (e.g., Intel Corporation's mote literature), as well as equivalents recognized by those having skill in the art. Mote 100 depicts a specific example of a more general mote. Mote 100 is illustrated as having antenna 102, physical layer 104, antenna entity 119, network layer 108 (shown for sake of example as a mote-appropriate ad hoc routing application), light device entity 110, electrical/magnetic device entity 112, pressure device entity 114, temperature device entity 116, volume device entity 118, and inertial device entity 120. Light device entity 110, electrical/magnetic device entity 112, pressure device entity 114, temperature device entity 116, volume device entity 118, antenna entity 119, and inertial device entity 120 are depicted to respectively couple through physical layers 104 with light device 140, electrical/magnetic device 142, pressure device 144, temperature device 156, volume device 158, antenna 102, and inertial device 160. Those skilled in the art will appreciate that the herein described entities and/or devices are illustrative, and that other entities and/or devices consistent with the teachings herein may be substituted and/or added.

Those skilled in the art will appreciate that in some implementations motes may contain their own power sources, while in other implementations power may be supplied to motes by an outside source (e.g., through electromagnetic induction from a parasitic network or optical to electrical conversion). Those skilled in the art will further appreciate that there are various ways in which motes may be distributed to form a mote network. For example, in some implementations the motes are randomly dispersed, while in other implementations the motes are either directly or indirectly in physical contact with (e.g., affixed to and/or integrated within) various inanimate and/or animate units (e.g., inanimate structural components such as those used in building, and/or bridges, and/or machines, and/or animate structural components such as rodents and/or birds and/or other animals). Those skilled in the art will appreciate that the herein described powering and/or distribution approaches are illustrative, and that other entities and/or devices consistent with the teachings herein may be substituted and/or added.

Those skilled in the art will appreciate that herein the term "device," as used in the context of devices comprising or coupled to a mote, is intended to represent but is not limited to transmitting devices and/or receiving devices dependent on context. For instance, in some exemplary contexts light device 140 is implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). In some exemplary implementations, electrical/magnetic device 142 is implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, pressure device 144 is implemented using one or more pressure transmitters (e.g., pressure transmission devices) and/or one or more pressure receivers (e.g., pressure reception devices) and/or one or more supporting devices (e.g., supporting hardware, firmware, and/or software). In some exemplary implementations, temperature device 156 is implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, volume device 158 is implemented using one or more volume transmitters (e.g., gas/liquid transmission devices) and/or one or more volume receivers (e.g., gas/liquid reception devices) and/or one or more supporting devices (e.g., supporting hardware, firmware, and/or software). In some exemplary implementations, inertial device 160 is implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture is utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) are present and active to allow/provide communications consistent with the teachings herein. Those having skill in the art will appreciate that these layers are not expressly shown/described herein for sake of clarity.

Figure 2:
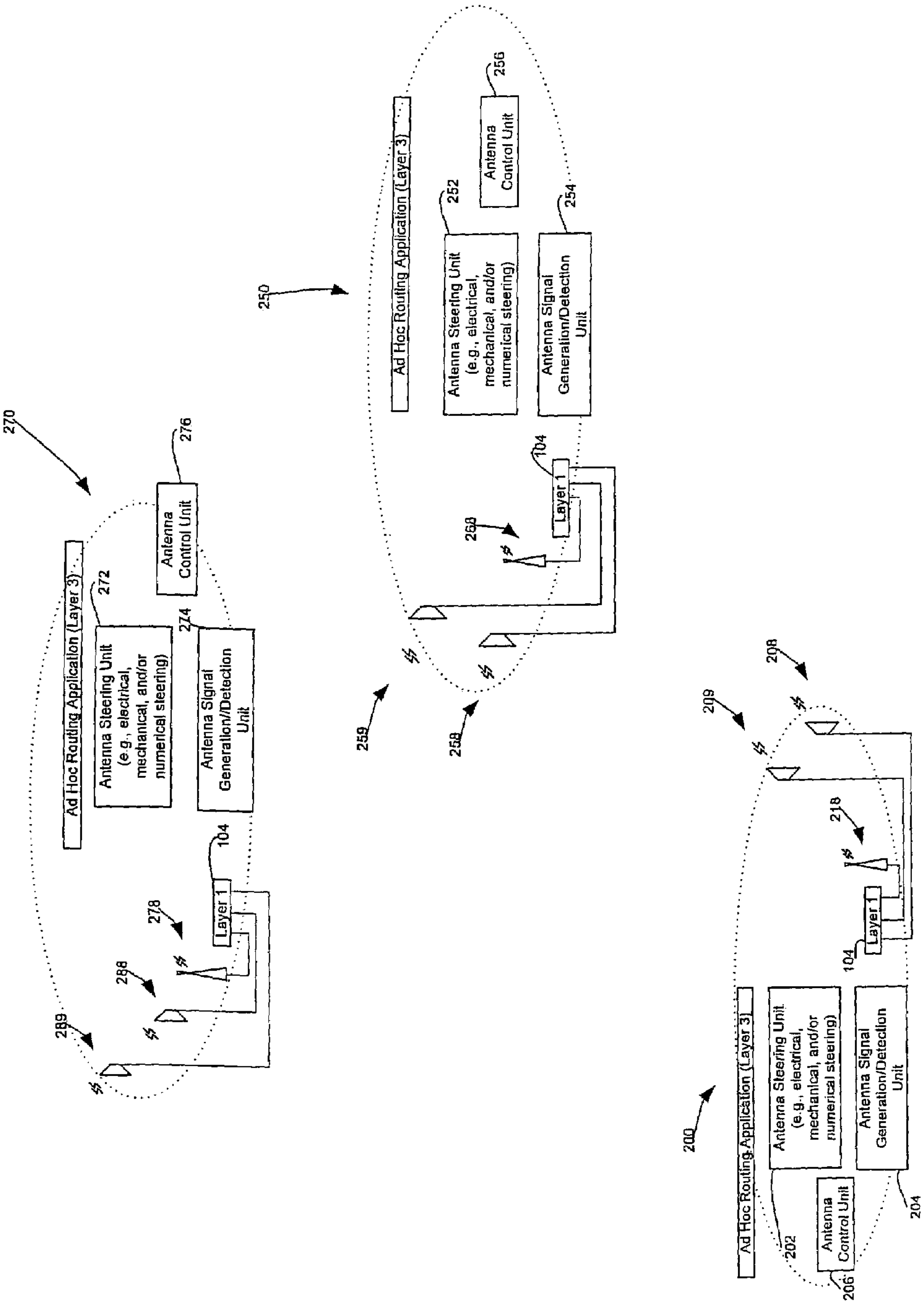
FIG. 2 depicts partial exploded views of motes 200, 250, and 270 that form a part of a mote network.

Referring now to FIG. 2, depicted are partial exploded views of motes 200, 250, and 270 that form a part of a mote network. Mote 200 is illustrated as similar to mote 100 of mote appropriate network 150 (FIG. 1), but with the addition of antenna steering unit 202, antenna signal detection/generation unit 204 ("direction/generation" indicates unit 204 may perform either or both detection and generation), antenna control unit 206, omni-directional antenna 218, and directional antennas 208, 209; the other components of mote 100 are also present in mote 200, but not explicitly shown for sake of clarity. The directional antennas described herein may be any suitable directional antennas consistent with the teachings herein, such as beam-forming antennas, beam-steering antennas, switched-beam antennas, horn antennas, and/or adaptive antennas. Although directional antennas 208, 209 are illustrated as horn antennas, those skilled in the art will appreciate that directional antennas 208, 209 are representative of any suitable device consistent with the teachings herein, such as Yagi antennas, log-periodic antennas, parabolic antennas, array antennas, horn antennas, and/or biconical antennas. The foregoing is also generally true for other directional antennas described herein. In addition, the inventor points out that in some implementations the antenna steering units described herein may include electromechanical systems such as those having piezoelectric components and/or those having micro-electro-mechanical system components; in some implementations, the antenna steering units may include electromagnetic systems.

Mote 250 is illustrated as similar to mote 100 of mote appropriate network 150 (FIG. 1), but with the addition of antenna steering unit 252, antenna signal generation/detection unit 254, antenna control unit 256, omnidirectional antenna 268, and directional antennas 258, 259. The other components of mote 100 are also present in mote 250, but not explicitly shown for sake of clarity. The components of mote 250 function in fashions similar to like components described in relation to mote 200 and/or elsewhere herein.

Mote 270 is illustrated as similar to mote 100 of mote appropriate network 150 (FIG. 1), but with the addition of antenna steering unit 252, antenna signal generation/detection unit 274, antenna control unit 276, omnidirectional antenna 278, and directional antennas 288, 289. The other components of mote 100 are also present in mote 270, but not explicitly shown for sake of clarity. The components of mote 270 function in fashions similar to like components described in relation to mote 200 and/or elsewhere herein.

Those skilled in the art will appreciate that there are various ways in which the directional antennas may be combined with the motes. In some implementations, semiconductor processing techniques are utilized to form at least a part of each mote having one or more directional antennas. In some implementations, micro-electro-mechanical-system or electrooptical techniques are utilized to form or control at least a part of each mote having one or more directional antennas. In some implementations, circuit techniques and circuit board substrates are used to form at least a part of each mote having one or more directional antennas. In some implementations, various combinations of the herein described techniques are used to form at least a part of each mote having one or more directional antennas.

II. Process(es) and/or Scheme(s)

Following are a series of flowcharts depicting implementations of processes and/or schemes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having ordinary skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations.

Figure 3:
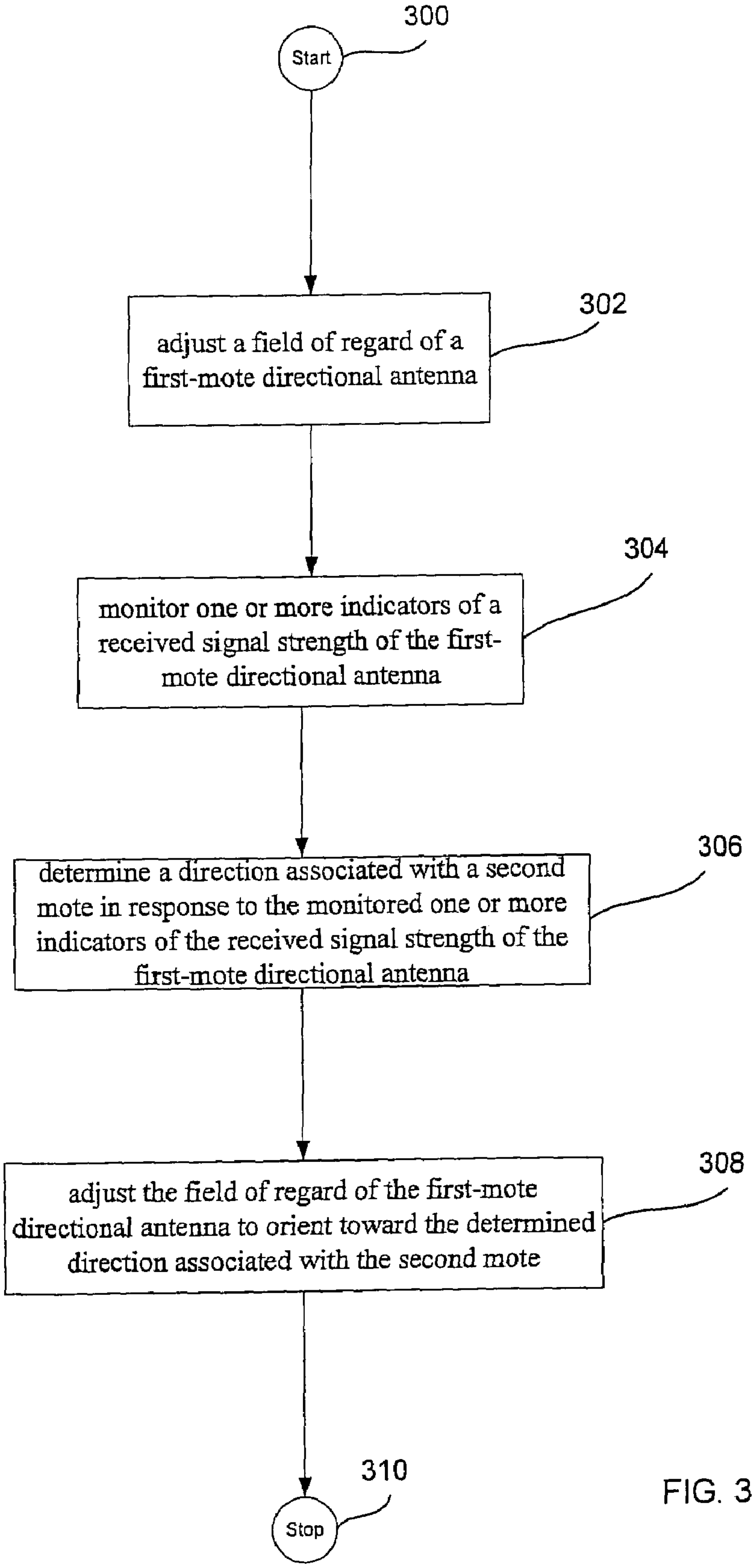
FIG. 3 depicts a high-level logic flowchart of a process.

With reference now to FIG. 3, depicted is a high level logic flowchart of a process. Method step 300 shows the start of the process. Method step 302 depicts adjusting a field of regard of a first-mote directional antenna. Method step 304 illustrates monitoring one or more indicators of received signal strength, signal-to-noise ratio, or other signal characteristic, of the first-mote directional antenna. Method step 306 shows determining a direction associated with a second mote in response to the monitored one or more indicators of the received signal strength of the first-mote directional antenna. Method step 308 depicts adjusting the field of regard of the first-mote directional antenna to orient toward the determined direction associated with the second mote. Method step 310 depicts the end of the process. Specific example implementations of the more general process implementations of FIG. 3 are described following.

Figure 4:
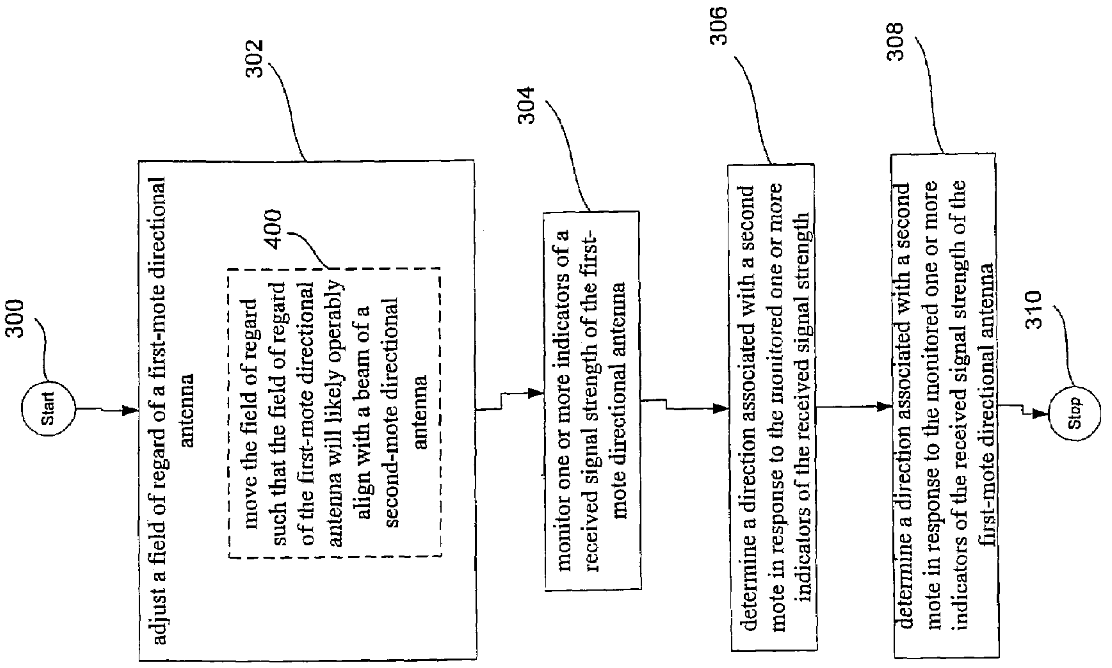
FIG. 4 illustrates a high-level logic flowchart depicting an alternate embodiment of the high-level logic flowchart of FIG. 3.

Referring now to FIG. 4, illustrated is a high-level logic flowchart depicting an alternate embodiment of the high-level logic flowchart of FIG. 3. Depicted is that in some embodiments method step 302 includes method step 400. Method step 400 shows moving the field of regard such that the field of regard of the first-mote directional antenna will likely operably align with a beam of a second-mote directional antenna. (By convention, "field of regard" is sometimes used herein when describing an example wherein an antenna is likely to receive a signal while "beam" is used when describing an example wherein an antenna is likely to transmit a signal.)

In one embodiment of method step 400, antenna control unit 256 directs antenna steering unit 252 to sweep a field of regard of directional antenna 258 at a rate likely to be different from that of a rate of sweep of a beam of another directional antenna. For example, antenna control units 206, 256 directing their respective antenna steering units 202, 252 to sweep their respective directional antennas 208, 258 at rates which are likely to be different. One implementation of the foregoing includes a network administrator pre-assigning different rates of sweep to antenna control units 206, 256. For example, a network administrator (not shown) may assign antenna control unit 206 a rate of sweep of 360 degrees/unit-time and assigning antenna control unit 256 a rate of sweep of 361 degrees/unit-time and directing antenna control unit 206, 256 to direct their respective antenna steering units 202, 252 to rotate directional antennas 208, 258 for a time period long enough such that directional antenna 208 completes 360 total rotations.

Figure 5:
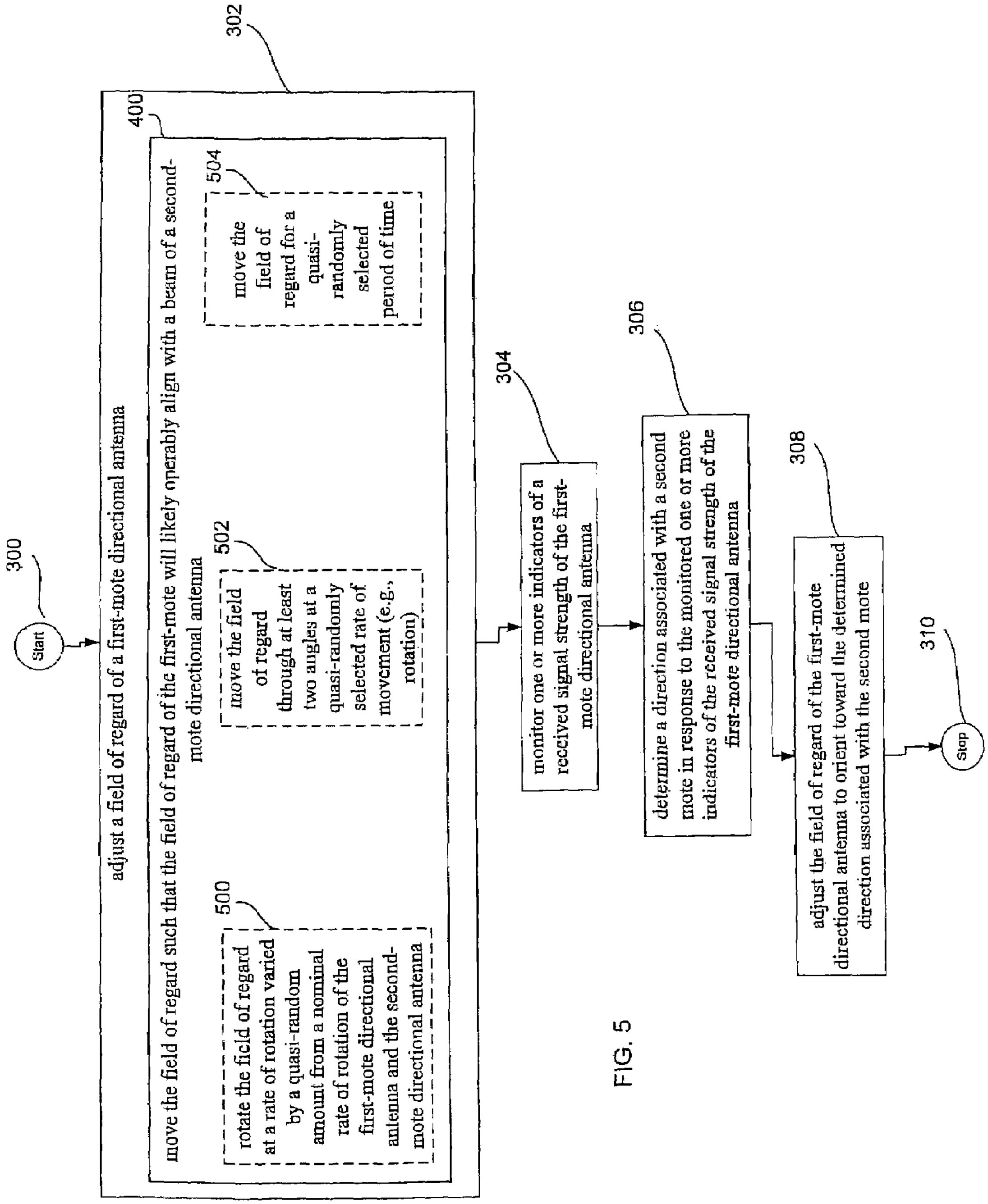
FIG. 5 illustrates a high-level logic flowchart depicting several alternate embodiments of the high-level logic flowchart of FIG. 4.

Referring now to FIG. 5, illustrated is a high-level logic flowchart depicting several alternate embodiments of the high-level logic flowchart of FIG. 4. Depicted is that in some embodiments method step 400 includes method step 500. Method step 500 shows rotating the field of regard at a rate of rotation varied by a quasi-random amount from a nominal rate of rotation of the first-mote directional antenna and the second-mote directional antenna.

In one embodiment of method step 500, antenna control unit 256 directs antenna steering unit 252 to rotate a field of regard of directional antenna 258 at a rate of rotation varied by a quasi-random amount from a nominal rate of rotation shared by at least one other mote (as used herein, "nominal" generally means according to plan or design). For example, in one implementation antenna control unit 256 recalls from memory a known nominal rate of rotation and then uses embodied logic to vary that recalled nominal rate of rotation by some amount to devise a mote 250 resultant rate of rotation (e.g., 360 degrees/unit-time). Thereafter, antenna control unit 256 directs antenna steering unit 252 to rotate directional antenna 258 at the mote 250 resultant rate of rotation. At or around the same time, antenna control unit 202 engages in a similar set of operations to devise a mote 200 rate of rotation. Insofar as that the mote 200 rate of rotation and the mote 250 rate of rotation were devised by quasi-random variations on substantially the same nominal rates of rotation, it is likely that the mote 200 rate of rotation will be different than the mote 250 rate of rotation. Hence, eventually the field of regard of directional antenna 208 will operably align with the beam of directional antenna 258 such that signals may be respectively received/transmitted between the directional antennas. In some implementations, the directional antennas are rotated for a pre-specified period of time. In some implementations, the directional antennas are rotated until either a strong signal is detected or a timeout occurs.

In one approach, the network administrator or logic within one or more of the antenna control units 206, 256 may include logic that can reduce the time to align by monitoring levels, level changes, or rates of change of the signal indicator and adjusting the rate or direction of movement in response. For example, at angles of the field of regard where the indicator is relatively high or deviates in some manner from other angles, the rate of rotation can be adjusted using relatively straightforward logic to improve the likelihood of establishing the desired alignment.

Continuing to refer to FIG. 5, illustrated is that in some embodiments method step 400 includes method step 502. Method step 502 shows moving the field of regard through at least two angles at a quasi-randomly selected rate of movement.

In one embodiment of method step 502, antenna control unit 256 directs antenna steering unit 252 to move a field of regard of directional antenna 258 through a series of angles at a rate of movement derived from random number generation logic (e.g., moving the field of regard through a 90 degree arc in discrete increments of 5 degrees at time intervals dictated by a random number generator).

Continuing to refer to FIG. 5, illustrated is that in some embodiments method step 400 includes method step 504. Method step 504 shows moving the field of regard for a quasi-randomly selected period of time.

In one embodiment of method step 504, antenna control unit 256 directs antenna steering unit 252 to move a field of regard of directional antenna 258 at some rate of rotation for a period of time derived from random number generation logic (e.g., moving the field of regard at 360 degrees/unit-time for a first interval of time dictated by a random number generator, moving the field of regard at 45 degrees/unit time for a second interval of time dictated by the random number generator).

Figure 6:
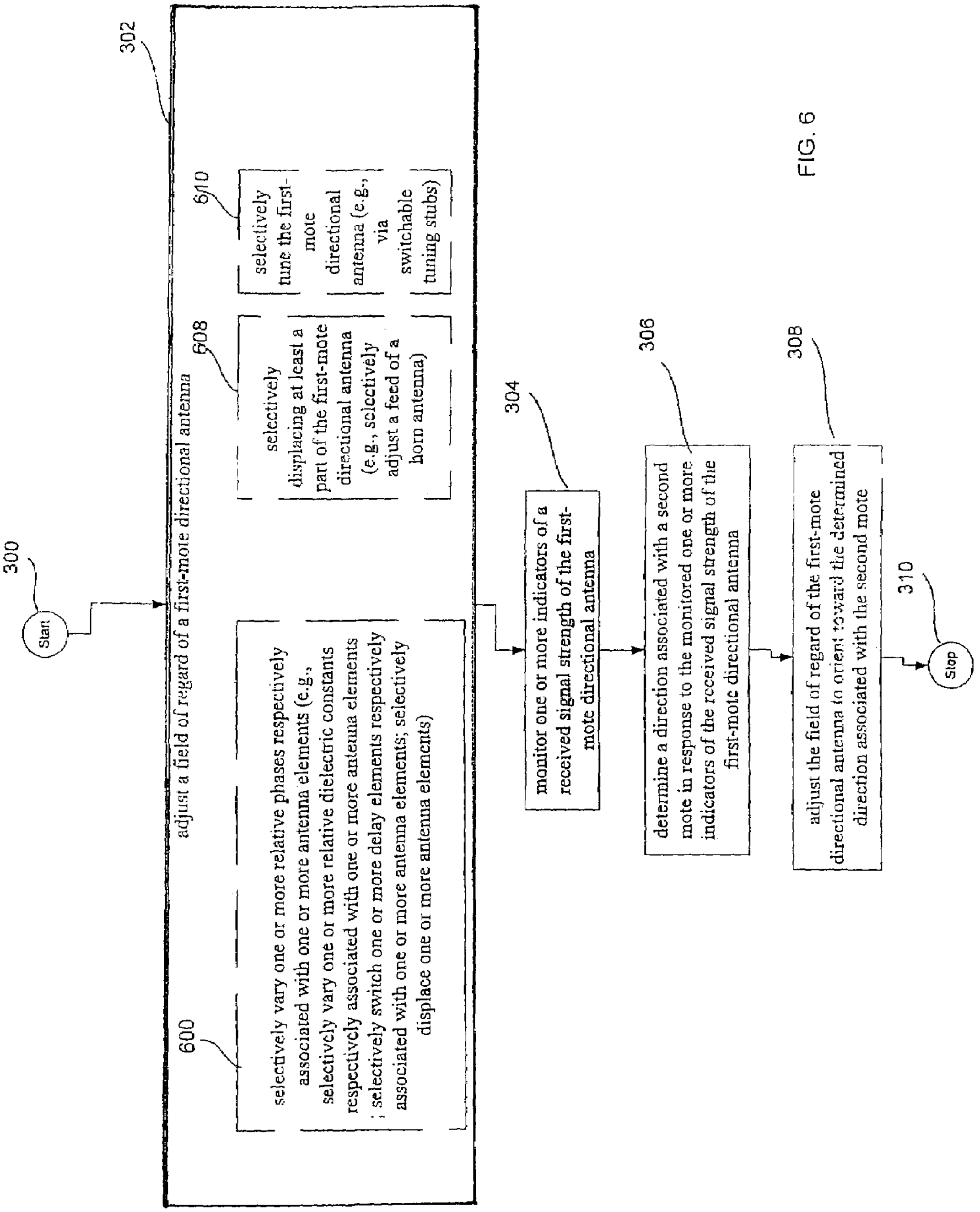
FIG. 6 illustrates a high-level logic flowchart depicting several alternate embodiments of the high-level logic flowchart of FIG. 3.

Referring now to FIG. 6, illustrated is a high-level logic flowchart depicting several alternate embodiments of the high-level logic flowchart of FIG. 3. Depicted is that in some embodiments method step 302 includes method step 600. Method step 600 shows selectively varying one or more relative phases respectively associated with one or more antenna elements.

In one embodiment of method step 600, antenna control unit 206 directs antenna steering unit 202 to selectively delay received signals such that a field of regard of directional antenna 208 is varied.

Continuing to refer to FIG. 6, shown is that in some implementations of method step 600, selectively varying one or more relative phases respectively associated with one or more antenna elements can include selectively varying one or more relative dielectric constants respectively associated with the one or more antenna elements. Also shown is that in some implementations of method step 600, selectively varying one or more relative phases respectively associated with one or more antenna elements can include selectively switching one or more delay elements respectively associated with the one or more antenna elements. Further shown is that in some implementations of method step 600, selectively varying one or more relative phases respectively associated with one or more antenna elements can include selectively displacing the one or more antenna elements. In some implementations of method step 600, such as where directional antenna 258 is implemented with discrete antenna elements (e.g., array antennas and/or Yagi antennas), antenna steering unit 252 delays one or more of the signals of the discrete antenna elements to steer the field of regard of directional antenna 258 in a desired fashion (e.g., by numerical techniques and/or delay lines).

Continuing to refer to FIG. 6, illustrated is that in some embodiments method step 302 includes method step 608. Method step 608 shows selectively displacing at least a part of the first-mote directional antenna. In some implementations of method step 608, such as instances where directional antenna 258 is implemented with a horn antenna or a biconical antenna, antenna steering unit 252 moves at least a part of the antenna, such as moving a feed of and/or rotating a horn antenna and/or moving a feed of and/or rotating a biconical antenna.

Continuing to refer to FIG. 6, shown is that in some embodiments method step 302 includes method step 610. Method step 610 shows selectively tuning the first-mote directional antenna (e.g., via switchable tuning stubs). In some implementations of method step 610, such as instances where directional antenna 258 is implemented with a tunable antenna (e.g., antennas having tuning stubs), antenna steering unit 252 either moves and/or switches in and out the various tuning stubs to direct the field of regard of directional antenna 258.

Figure 7:
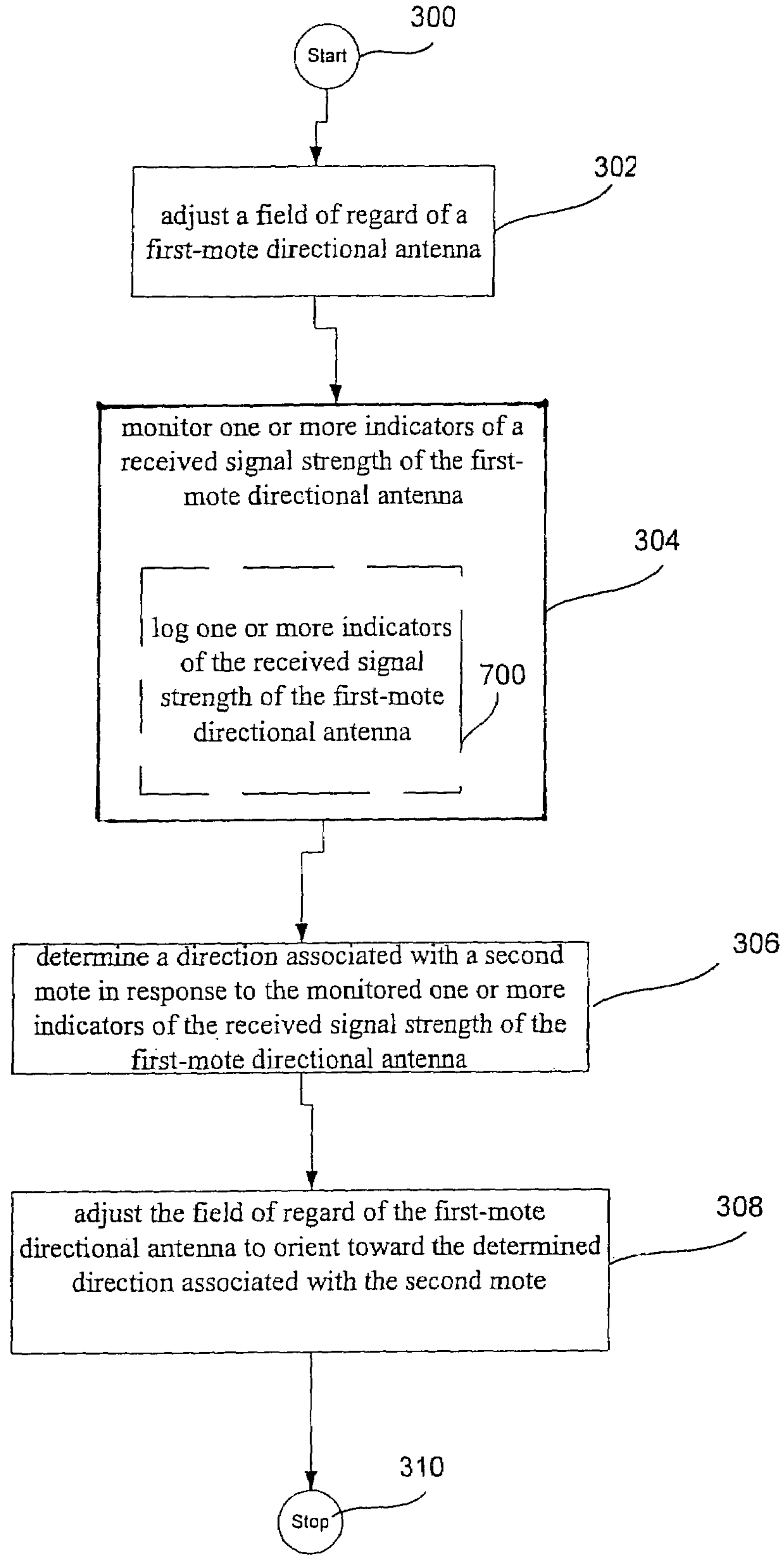
FIG. 7 illustrates a high-level logic flowchart depicting an alternate embodiment of the high-level logic flowchart of FIG. 3.

Referring now to FIG. 7, illustrated is a high-level logic flowchart depicting an alternate embodiment of the high-level logic flowchart of FIG. 3. Depicted is that in some embodiments method step 304 includes method step 700. Method step 700 shows logging one or more indicators of the received signal strength of the first-mote directional antenna.

In one embodiment of method step 700, antenna control unit 256 directs antenna signal generation/detection unit 254 to log a received signal strength indicator of a known beacon signal. For example, in one implementation antenna signal generation/detection unit 254 contains a correlation detector having as a reference the beacon signal; the output of the correlation detector is stored to a memory which antenna control unit 256 can then access. Those having ordinary skill of the art will appreciate that other signal detection techniques, consistent with the teachings herein, may be substituted.

Figure 8:
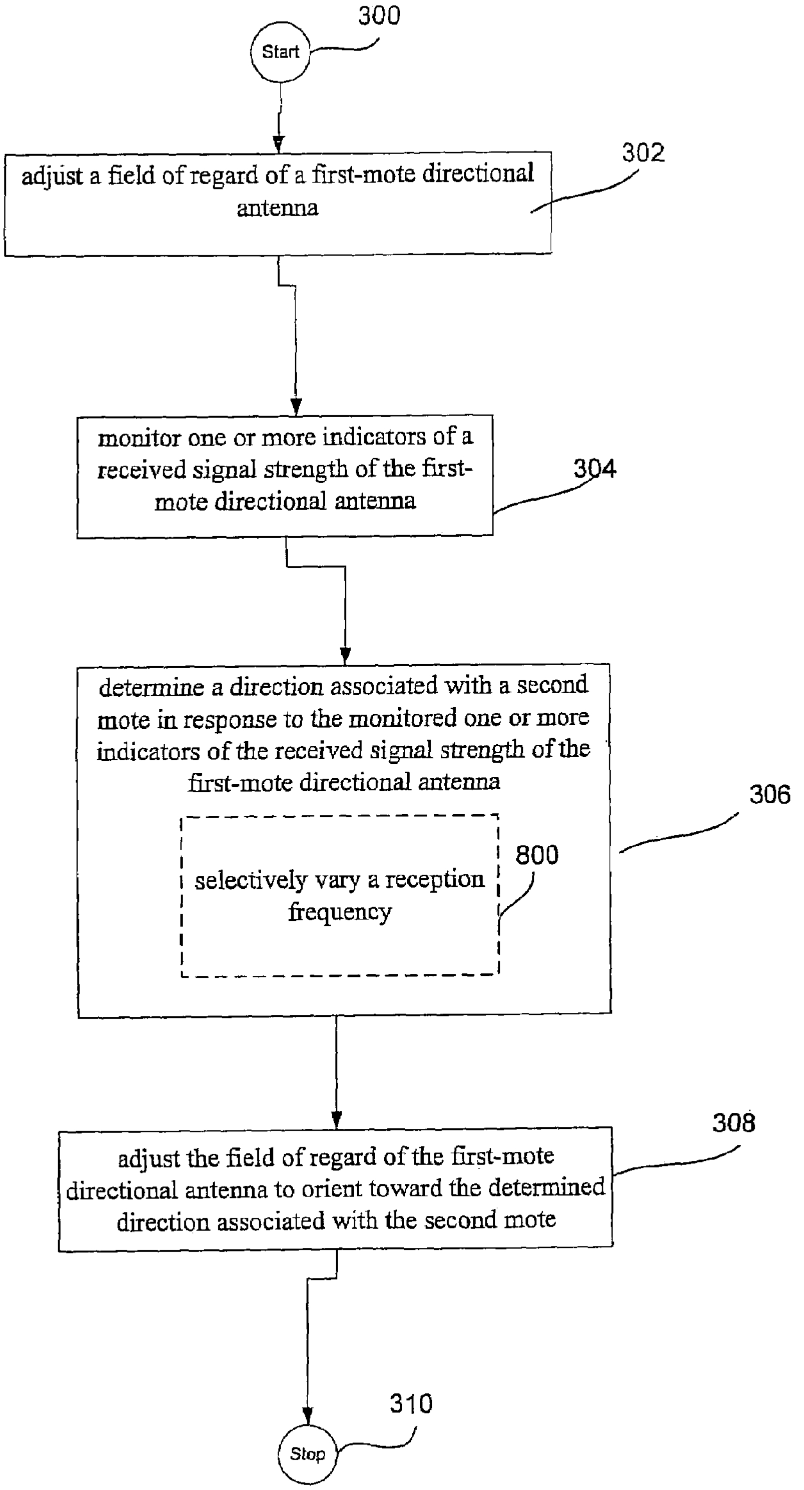
FIG. 8 illustrates a high-level logic flowchart depicting an alternate embodiment of the high-level logic flowchart of FIG. 3.

With reference now to FIG. 8, illustrated is a high-level logic flowchart depicting an alternate embodiment of the high-level logic flowchart of FIG. 3. Depicted is that in some embodiments method step 306 includes method step 800. Method step 800 shows selectively varying a reception frequency.

In one embodiment of method step 800, antenna control unit 256 directs antenna signal generation/detection unit 254 to vary a reference frequency of a demodulator from a nominal value. In some implementations, the way in which the reference frequency is varied is deterministic (e.g., varying above and below the nominal frequency by 5 Hz increments for predetermined and/or quasi-random periods of time). In some implementations, the way in which the reference frequency is varied is quasi-random (e.g., varying above and below the nominal frequency by quasi-random increments for predetermined periods of time). For example, in one implementation antenna signal generation/detection unit 254 contains demodulation logic whose reference frequency can be varied in fashions as described herein. Those having ordinary skill of the art will appreciate that other signal demodulation techniques, consistent with the teachings herein, may be substituted.

Figure 9:
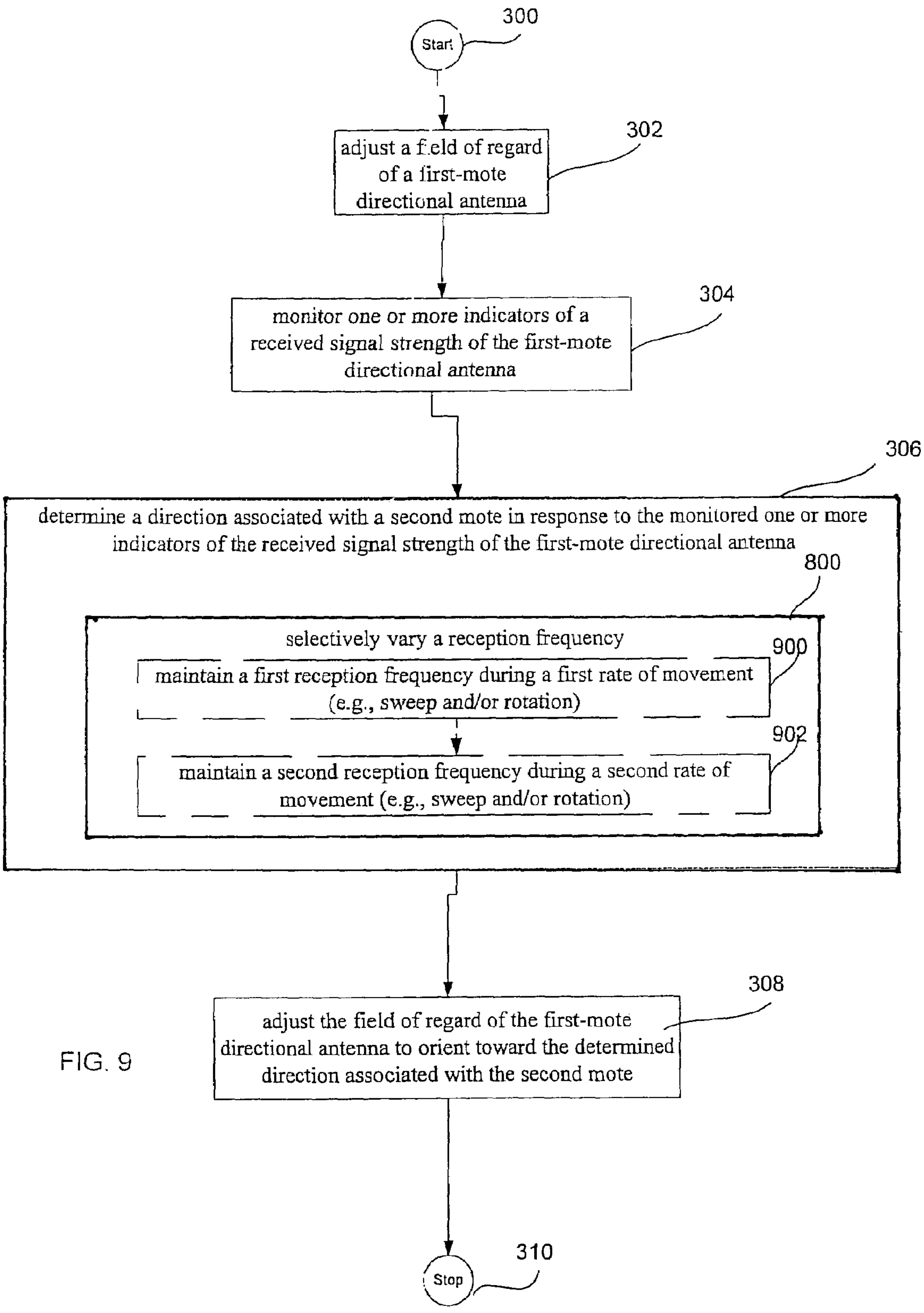
FIG. 9 illustrates a high-level logic flowchart depicting an alternate embodiment of the high-level logic flowchart of FIG. 8.

With reference now to FIG. 9, illustrated is a high-level logic flowchart depicting an alternate embodiment of the high-level logic flowchart of FIG. 8. Depicted is that in some embodiments method step 800 includes method step 900 and 902. Method step 900 shows maintaining a first reception frequency during a first rate of movement. Method step 902 shows maintaining a second reception frequency during a second rate of movement.

In one embodiment of method step 900, antenna control unit 256 directs antenna signal generation/detection unit 254 to maintain a first reference frequency of a demodulator while antenna control unit 256 is causing antenna steering unit 252 to sweep/rotate at a first rate. In one embodiment of method step 902, antenna control unit 256 directs antenna signal generation/detection unit 254 to maintain a second reference frequency while antenna control unit 256 is causing antenna steering unit 252 to sweep/rotate at a second rate. In some implementations, the way in which the first and the second reference frequencies are chosen is deterministic (e.g., varying above and below some nominal frequency by 5 Hz increments for predetermined and/or quasi-random periods of time). In some implementations, the way in which the reference frequency is varied is quasi-random (e.g., varying above and below a nominal frequency by quasi-random amounts dictated by a random number generator).

Figure 10:
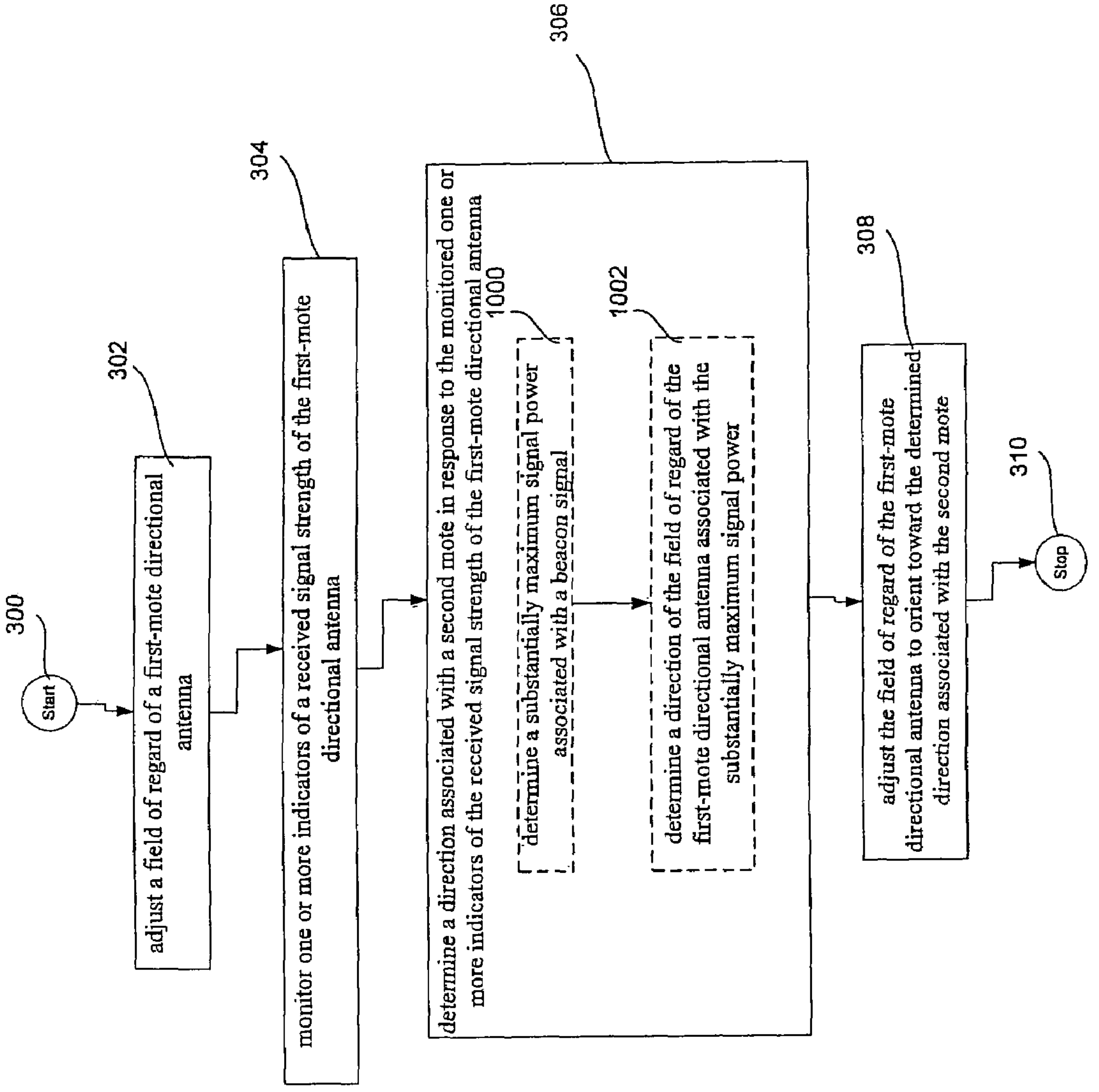
FIG. 10 illustrates a high-level logic flowchart depicting an alternate embodiment of the high-level logic flowchart of FIG. 3.

With reference now to FIG. 10, illustrated is a high-level logic flowchart depicting an alternate embodiment of the high-level logic flowchart of FIG. 3. Depicted is that in some embodiments method step 306 includes method step 1000 and 1002. Method step 1000 shows determining a substantially maximum signal power associated with a beacon signal. Method step 1002 depicts determining a direction of the field of regard of the first-mote directional antenna associated with the substantially maximum signal power.

In one embodiment of method step 1000, antenna control unit 206 communicates with antenna signal generation/detection unit 254 to determine one or more times during which received signal strength of a beacon signal was at one or more substantially maximum values. In one embodiment of method step 1002, antenna control unit 206 communicates with antenna steering unit 252 to determine one or more locations along an arc of movement of directional antenna 258 that correspond with the times at which the received signal strength of the beacon signal was at one or more substantially maximum values.

Figure 11:
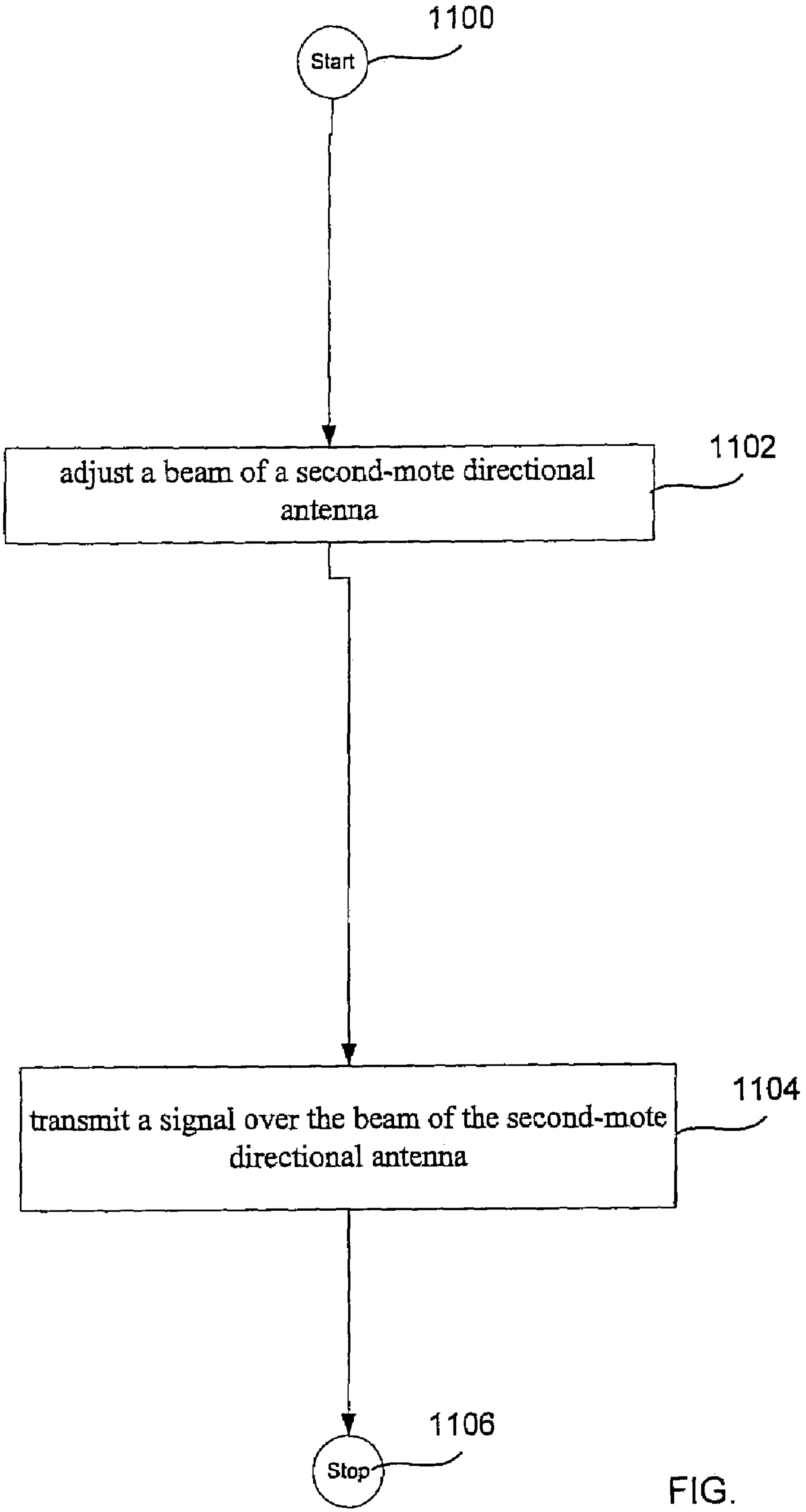
FIG. 11 depicts a high level logic flowchart of a process.

With reference now to FIG. 11, depicted is a high level logic flowchart of a process. Method step 1100 shows the start of the process. Method step 1102 depicts adjusting a beam of a second-mote directional antenna. Method step 1104 illustrates transmitting a signal over the beam of the second-mote directional antenna. Method step 1106 depicts the end of the process. Specific example implementations of the more general process implementations of FIG. 11 are described following.

Figure 12:
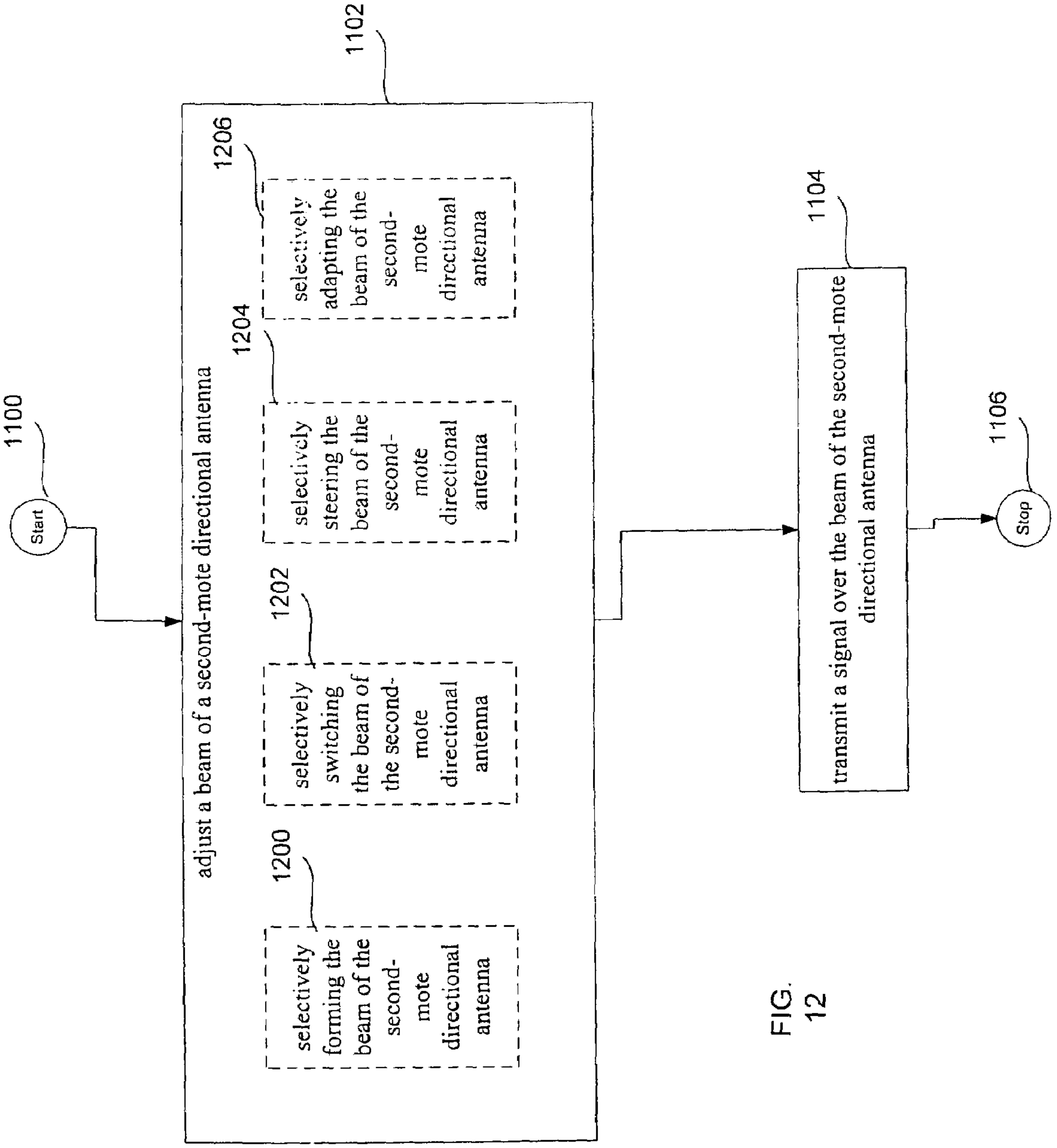
FIG. 12 illustrates a high-level logic flowchart depicting several alternate embodiments of the high-level logic flowchart of FIG. 11.

Referring now to FIG. 12, illustrated is a high-level logic flowchart depicting several alternate embodiments of the high-level logic flowchart of FIG. 11. Depicted is that in some embodiments method step 1102 includes method step 1200. Method step 1200 shows selectively forming the beam of the second-mote directional antenna.

In one embodiment of method step 1200, antenna control unit 206 directs antenna steering unit 202 to drive directional antenna 208 such that a beam is formed over one or more angular ranges. One example of the foregoing could include forming a series of beams across a series of angles.

Continuing to refer to FIG. 12, illustrated is that in some embodiments method step 1102 includes method step 1202. Method step 1202 depicts selectively switching the beam of the second-mote directional antenna.

In some implementations of method step 1202, antenna control unit 206 directs antenna steering unit 202 to switch elements of directional antenna 208 such that a beam is switched on across one or more angles. One example of the foregoing could include switching a series of discrete beams across a series of discrete angles.

Continuing to refer to FIG. 12, illustrated is that in some embodiments method step 1102 includes method step 1204. Method step 1204 depicts selectively steering the beam of the second-mote directional antenna.

In some implementations of method step 1204, antenna control unit 206 directs antenna steering unit 202 to selectively steer a beam of directional antenna 208 such that a beam is moved across one or more angles. One example of the foregoing could include causing a horn or a biconical antenna to move across a series of angles (e.g., rotate in a circle).

Continuing to refer to FIG. 12, illustrated is that in some embodiments method step 1102 includes method step 1206. Method step 1206 depicts selectively adapting the beam of the second-mote directional antenna.

In some implementations of method step 1206, antenna control unit 206 directs antenna steering unit 202 to selectively adapt one or more beams of directional antenna 208 such that a beam is moved across one or more angles. One example of the foregoing could include selectively adapting the beam of the second-mote directional antenna.

With reference again to FIGS. 3 and 11, method step 302 of FIG. 3, and its supporting text, show and/or describe adjusting a field of regard of a first-mote directional antenna. Method step 1102 of FIG. 11, and its supporting text, illustrate and/or describe adjusting a beam of a second-mote directional antenna (e.g., directional antenna 208 of mote 200).

FIGS. 4-6 show and/or describe several implementations of adjusting a field of regard of the first-mote directional antenna. The inventor points out that implementations substantially analogous to those shown for method step 302 are also contemplated for method step 1102. Specifically, each shown/described example of adjusting the field of regard as described elsewhere herein will in general have a corresponding implementation by which the beam of a second-mote directional antenna is analogously adjusted. Those having skill in the art will appreciate that insofar as that transmitting and receiving are essentially mirror operations and that beam forming and defining field of regard are complementary actions, the examples of adjusting the field of regard set forth above may also be viewed as constituting examples of adjusting beams. In light of the foregoing, those having skill in the art will appreciate that FIGS. 4-6 and their supporting texts, combined with generally known aspects of beam forming, teach such beam forming implementations; consequently, the beam adjusting implementations are not expressly redescribed here for sake of clarity.

Figure 13:
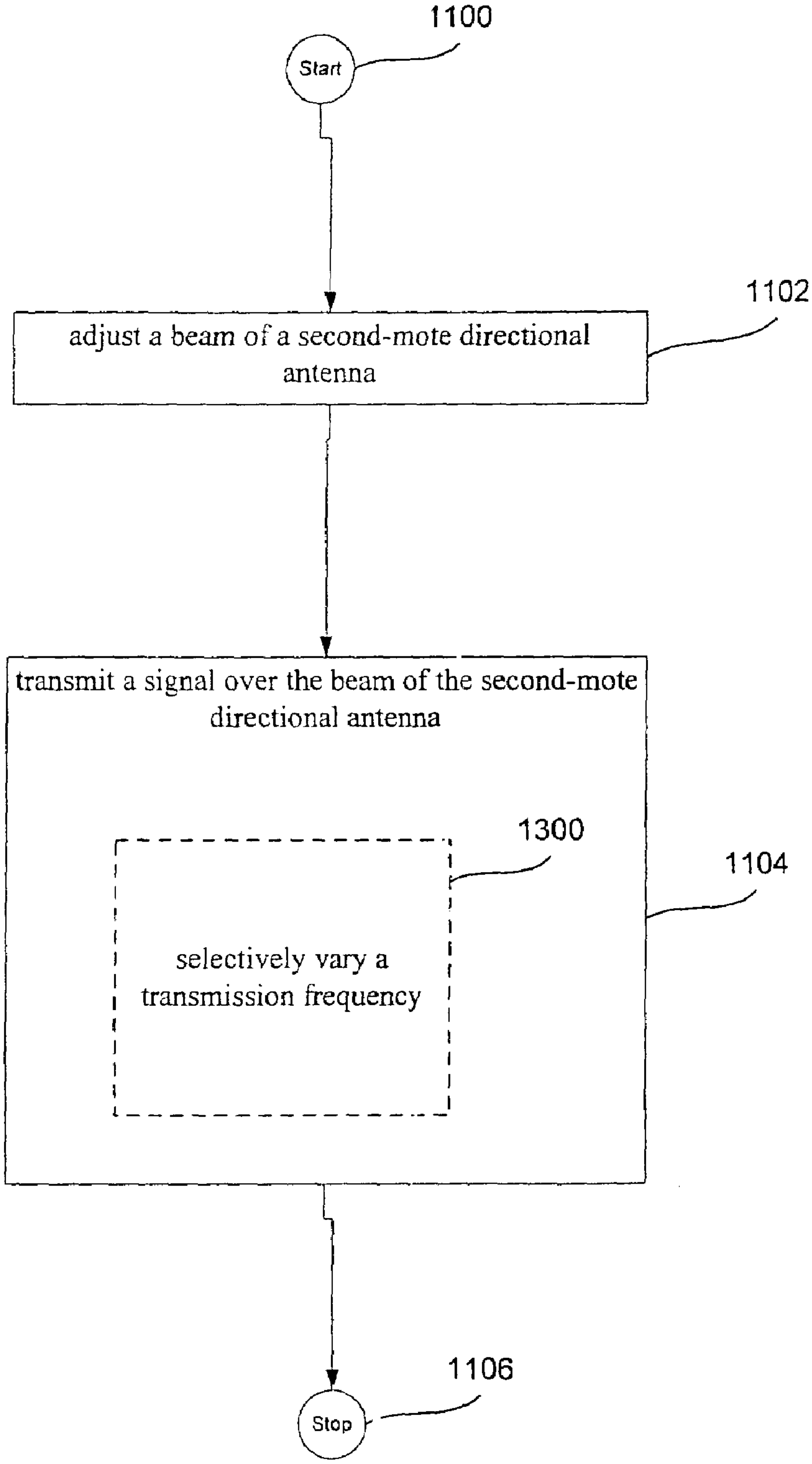
FIG. 13 illustrates a high-level logic flowchart depicting an alternate embodiment of the high-level logic flowchart of FIG. 11.

With reference now to FIG. 13, illustrated is a high-level logic flowchart depicting an alternate embodiment of the high-level logic flowchart of FIG. 11. Depicted is that in some embodiments method step 1104 includes method step 1300. Method step 1300 shows selectively varying a transmission frequency.

In one embodiment of method step 1300, antenna control unit 206 directs signal generation/detection unit 204 to vary a carrier frequency of a modulator from a nominal value. In some implementations, the way in which the carrier frequency is varied is deterministic (e.g., varying above and below the nominal frequency by 5 Hz increments for predetermined and/or quasi-random periods of time). In some implementations, the way in which the carrier frequency is varied is quasi-random (e.g., varying above and below the nominal frequency by quasi-random amounts for predetermined periods of time).

In one implementation, antenna signal generation/detection unit 204 contains a modulator that combines a known beacon signal with the carrier signal which is then transmitted from directional antenna 208. Those having ordinary skill of the art will appreciate that other signal generation techniques, consistent with the teachings herein, may be substituted.

Figure 14:
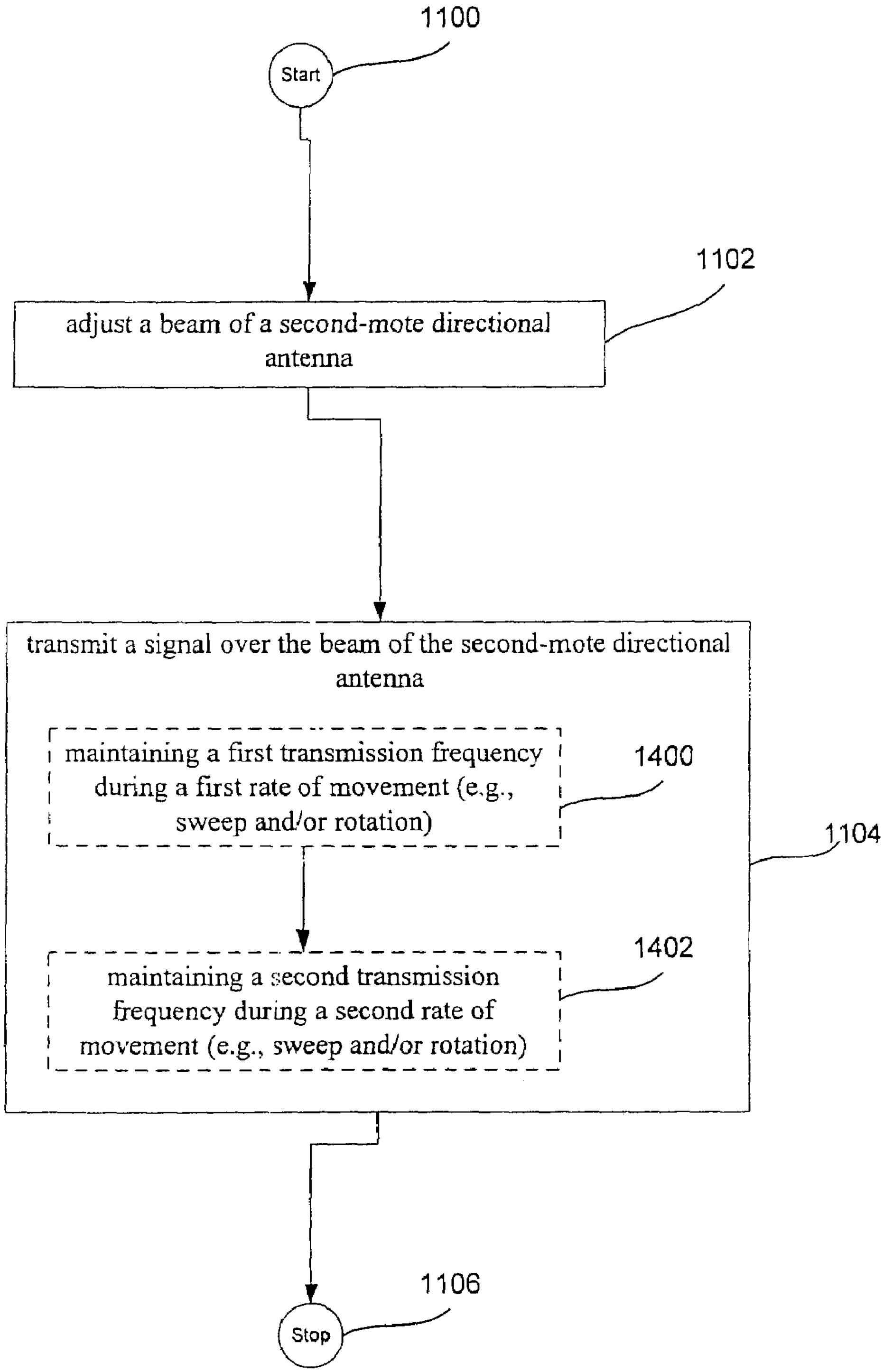
FIG. 14 illustrates a high-level logic flowchart depicting an alternate embodiment of the high-level logic flowchart of FIG. 11.

With reference now to FIG. 14, illustrated is a high-level logic flowchart depicting an alternate embodiment of the high-level logic flowchart of FIG. 11. Depicted is that in some embodiments method step 1104 includes method steps 1400 and 1402. Method step 1400 shows maintaining a first transmission frequency during a first rate of movement (e.g., sweep and/or rotation). Method step 1402 shows maintaining a second transmission frequency during a second rate of movement (e.g., sweep and/or rotation).

In one embodiment of method step 1400, antenna control unit 206 directs antenna signal generation/detection unit 204 to maintain a first carrier frequency of a modulator while antenna control unit 206 is causing antenna steering unit 202 to sweep/rotate at a first rate. In one embodiment of method step 1400, antenna control unit 206 directs antenna signal generation/detection unit 204 to maintain a second carrier frequency of a modulator while antenna control unit 206 is causing antenna steering unit 202 to sweep/rotate at a second rate. In some implementations, the way in which the carrier frequency is varied is deterministic (e.g., varying above and below the nominal frequency by 5 Hz increments for predetermined and/or quasi-random periods of time). In some implementations, the way in which the carrier frequency is varied is quasi-random (e.g., varying above and below the nominal frequency by quasi-random amounts for predetermined periods of time).

Figure 15:
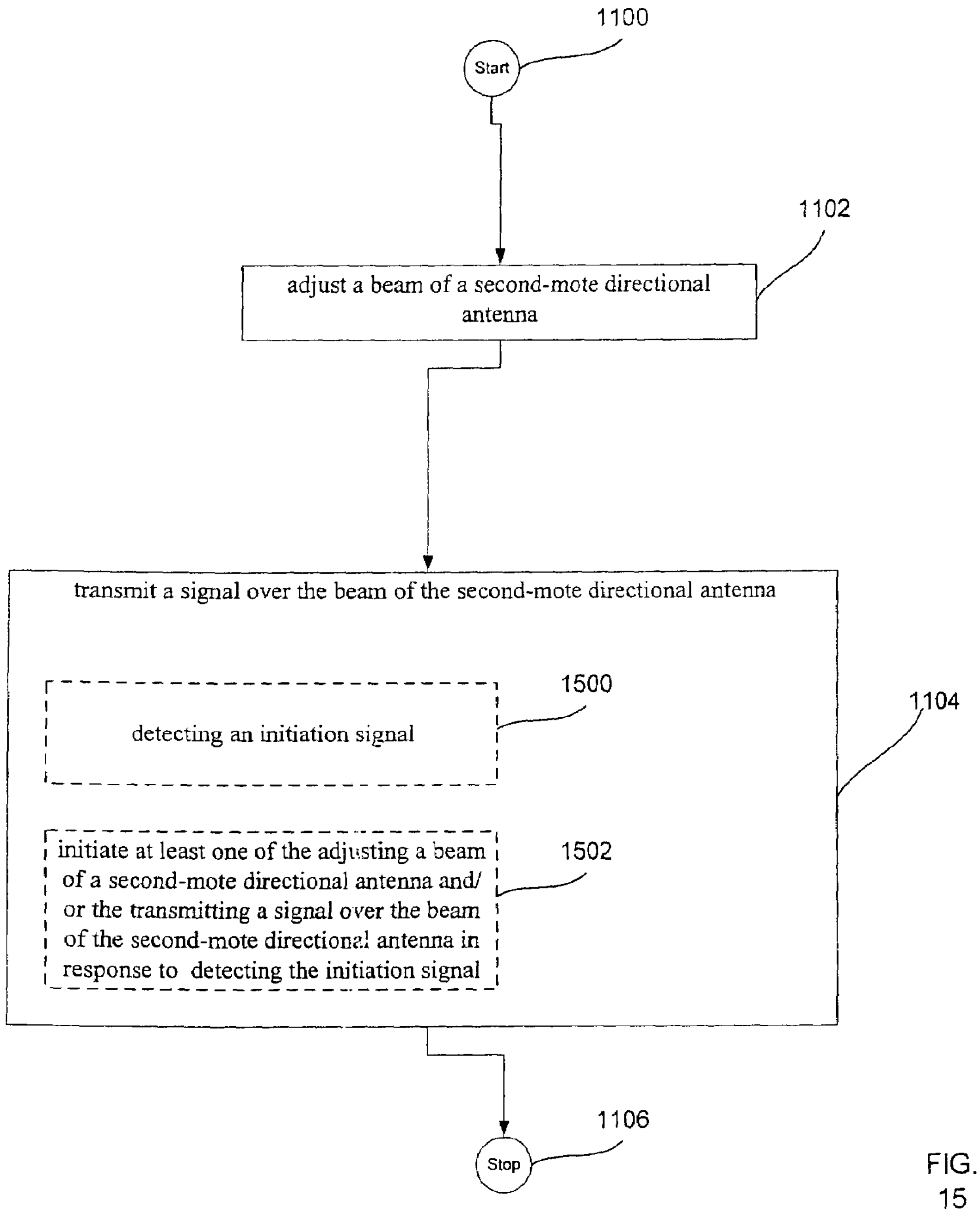
FIG. 15 illustrates a high-level logic flowchart depicting an alternate embodiment of the high-level logic flowchart of FIG. 11.

Referring now to FIG. 15, illustrated is a high-level logic flowchart depicting an alternate embodiment of the high-level logic flowchart of FIG. 11. Depicted is that in some embodiments method step 1104 includes method steps 1500 and 1502. Method step 1500 shows detecting an initiation signal. Method step 1502 depicts initiating at least one of said adjusting a beam of a second-mote directional antenna and/or said transmitting a signal over the beam of the second-mote directional antenna in response to said detecting the initiation signal.

In one embodiment of method step 1500, antenna signal generation/detection unit 204 detects an incoming pre-defined seek-mote-antennas signal over directional antenna 208. Signal generation/detection unit 204 informs antenna control unit 206 that the seek-mote-antennas signal has been received. In response, antenna control unit 206 directs antenna signal generation/detection unit 204 to generate a pre-defined beacon signal and/or communicates with antenna steering unit 252 to begin adjusting a beam of directional antenna 208 as described herein (e.g., by moving the beam in an arc or circle through a discrete set of angles, etc.).

Figure 16:
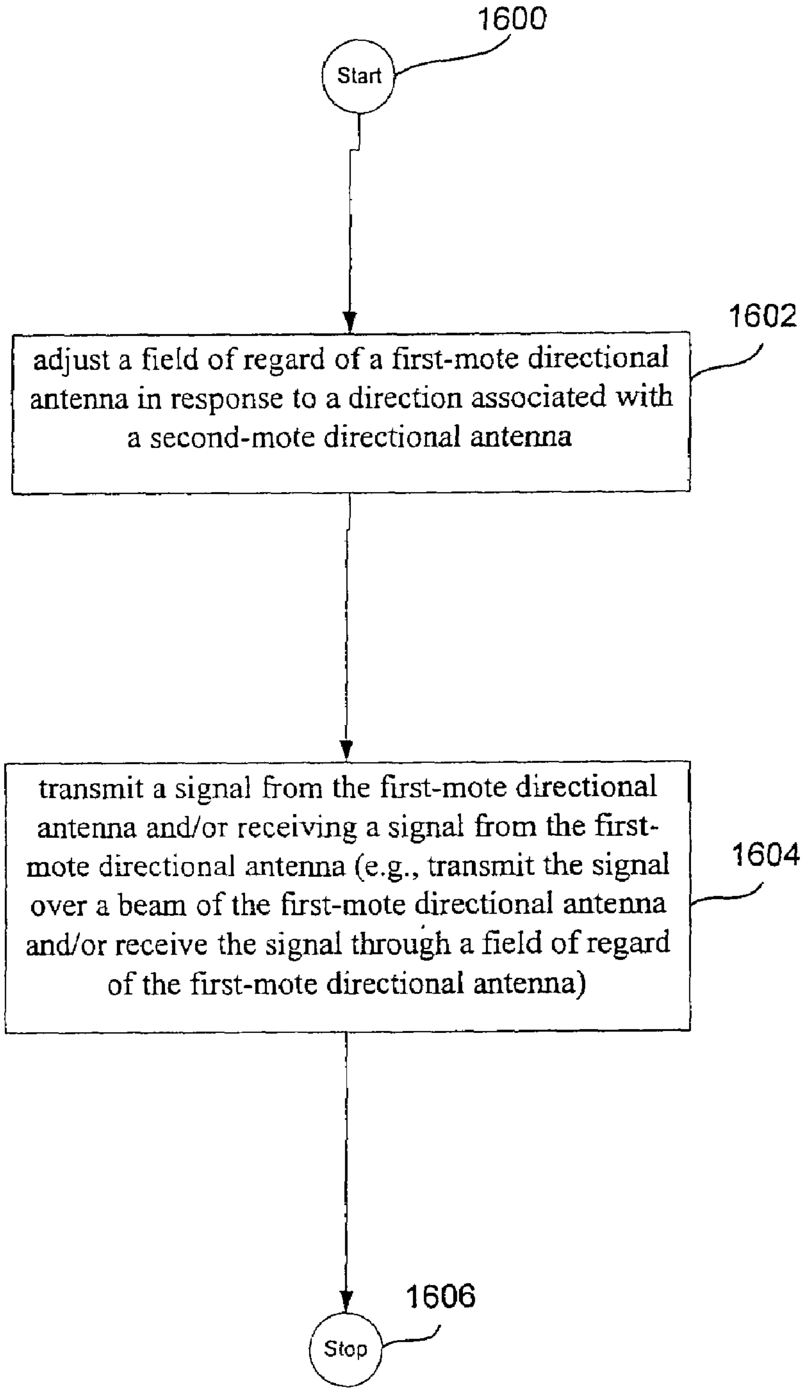
FIG. 16 depicts a high level logic flowchart of a process.

With reference now to FIG. 16, depicted is a high level logic flowchart of a process. Method step 1600 shows the start of the process. Method step 1602 depicts adjusting a field of regard of a first-mote directional antenna in response to a direction associated with a second-mote directional antenna. Method step 1604 illustrates transmitting a signal from the first-mote directional antenna and/or receiving a signal from the first-mote directional antenna (e.g., transmitting the signal over a beam of the first-mote directional antenna and/or receiving the signal through a field of regard of the first-mote directional antenna). Method step 1606 depicts the end of the process. Specific example implementations of the more general process implementations of FIG. 16 are described following.

Figure 17:
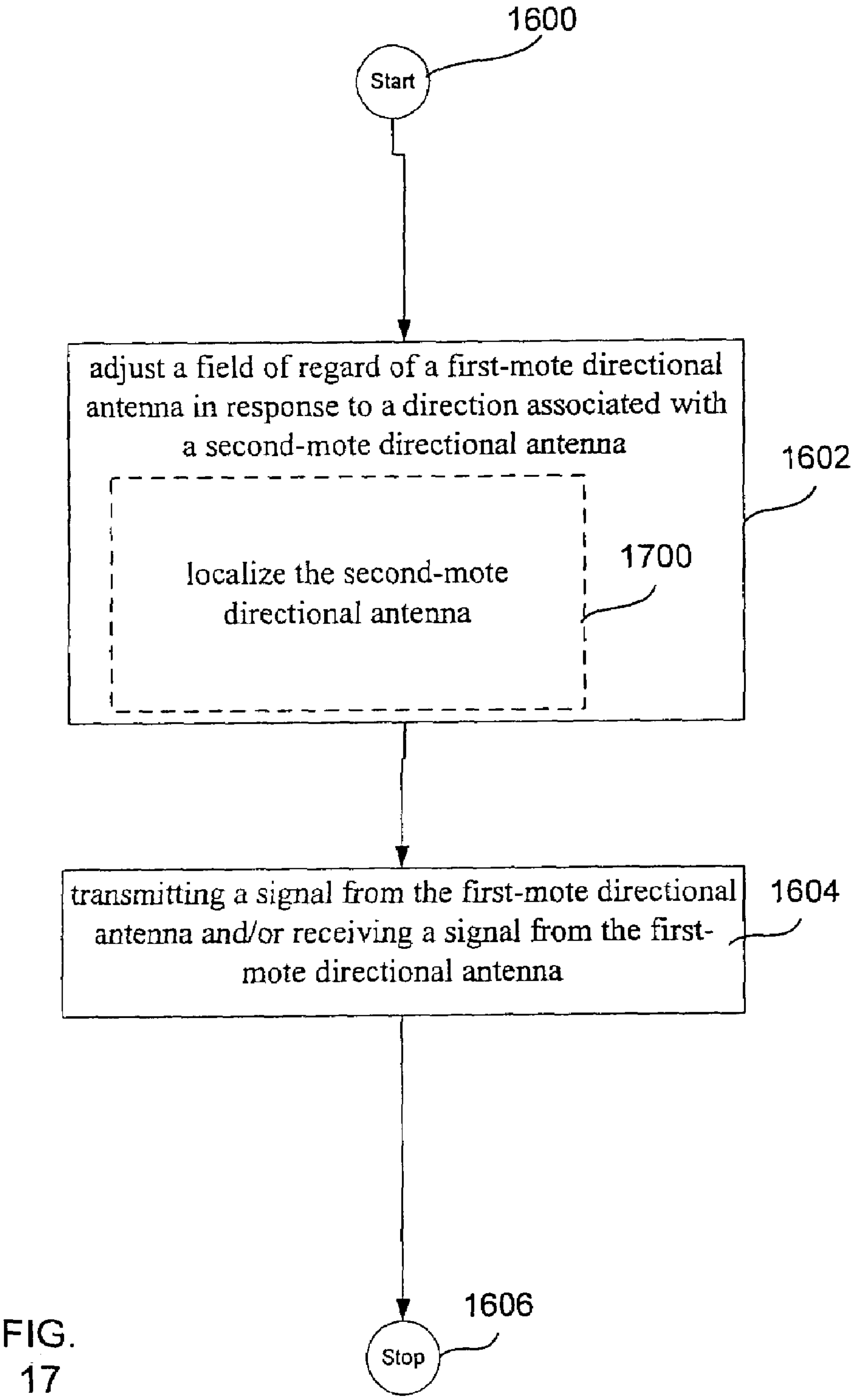
FIG. 17 illustrates a high-level logic flowchart depicting an alternate embodiment of the high-level logic flowchart of FIG. 16.

Referring now to FIG. 17, illustrated is a high-level logic flowchart depicting an alternate embodiment of the high-level logic flowchart of FIG. 16. Depicted is that in some embodiments method step 1602 includes method step 1700. Method step 1700 shows localizing the second-mote directional antenna. Specific example implementations of the more general process implementations of FIG. 17 are described following.

Figure 18:
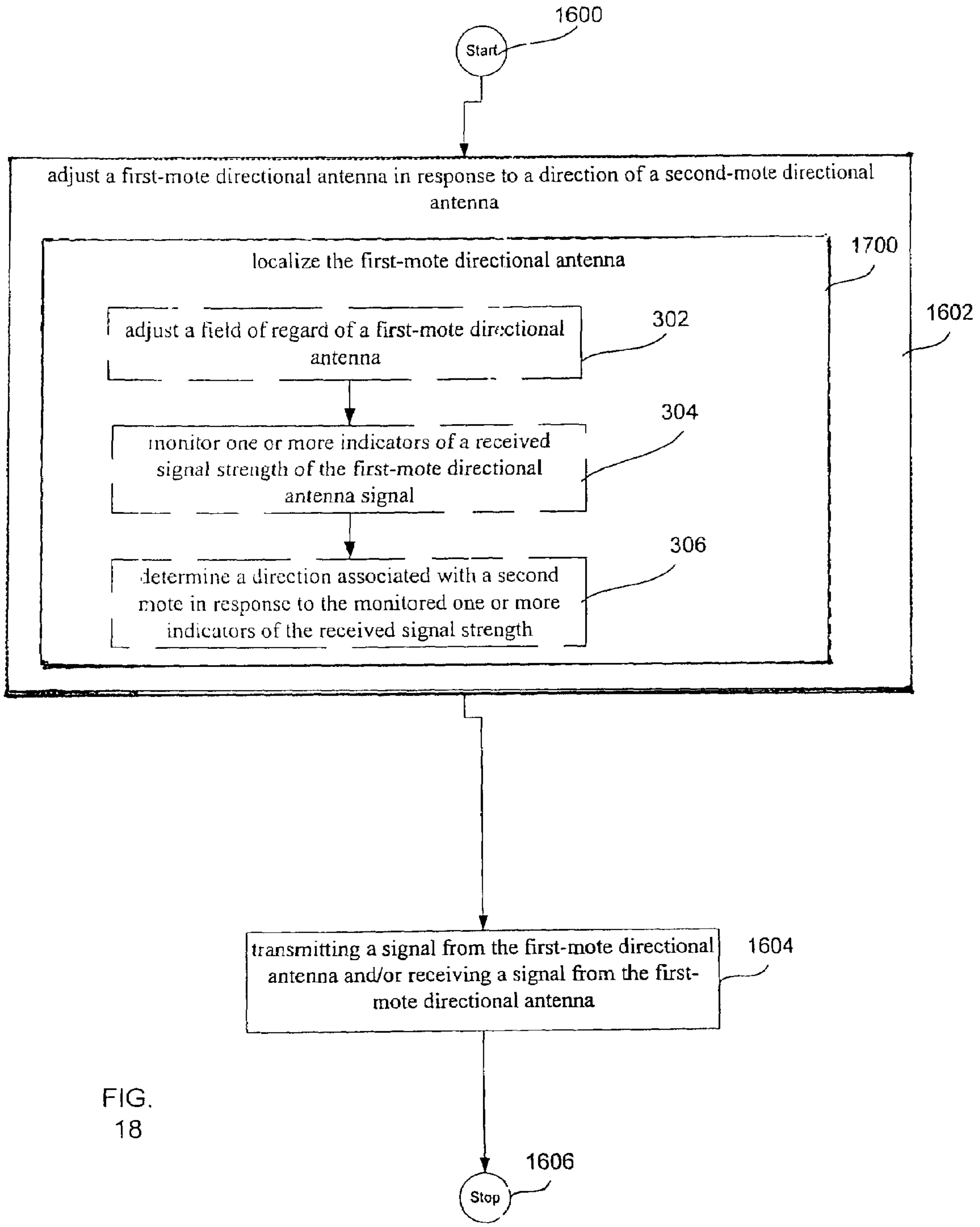
FIG. 18 illustrates a high-level logic flowchart depicting an alternate embodiment of the high-level logic flowchart of FIG. 17.

With reference now to FIG. 18, illustrated is a high-level logic flowchart depicting an alternate embodiment of the high-level logic flowchart of FIG. 17. Depicted is that in some embodiments method step 1700 includes method steps 302, 304, and 306. Method steps 302, 304, and 306, as well as various multiple implementations of such steps, are described elsewhere herein—e.g., FIGS. 3-6—and are hence not redescribed here for sake of clarity. However, it is to be understood that method steps 302, 304, and 306 as illustrated in FIG. 18 are intended to incorporate and/or represent substantially all aspects and/or facets of the various implementations of method steps 302, 304, and 306 as shown and described elsewhere herein, unless context requires otherwise.

Those having skill in the art will recognize that the state of the art has progressed to the point where for many design choices there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote-appropriate computing/communication systems, combined with standard engineering practices. Specific examples of such components entail commercially described components such as Intel Corporation's mote components and supporting hardware, software, and firmware.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

While particular aspects of the present subject matter described herein have been shown and described, it will be obvious to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together etc.). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together, etc.).

The invention claimed is:

1. A mote method comprising:

adjusting a field of regard of a first-mote directional antenna, wherein said adjusting a field of regard of a first-mote directional antenna further comprises:

moving the field of regard such that the field of regard of the first-mote directional antenna will likely operably align with a beam of a second-mote directional antenna, wherein said moving the field of regard such that the field of regard of the first-mote directional antenna will likely operably align with a beam of a second-mote directional antenna further comprises:

moving the field of regard through at least two angles at a quasi-randomly selected rate of movement;

monitoring one or more indicators of a received signal strength of the first-mote directional antenna; and determining a direction associated with a second mote in response to the monitored one or more indicators of the received signal strength of the first-mote directional antenna.

2. The method of claim 1, wherein said moving the field of regard such that the field of regard of the first-mote directional antenna will likely operably align with a beam of a second-mote directional antenna further comprises:

rotating the field of regard at a rate of rotation varied by a quasi-random amount from a nominal rate of rotation of the first-mote directional antenna and/or the second-mote directional antenna.

3. The method of claim 1, wherein said moving the field of regard such that the field of regard of the first-mote directional antenna will likely operably align with a beam of a second-mote directional antenna further comprises:

moving the field of regard for a quasi-randomly selected period of time.

4. The method of claim 1, wherein said adjusting a field of regard of a first-mote directional antenna further comprises:

selectively varying one or more relative phases respectively associated with one or more antenna elements.

5. The method of claim 4, wherein said selectively varying one or more relative phases respectively associated with one or more antenna elements further comprises:

selectively varying one or more relative dielectric constants respectively associated with the one or more antenna elements.

6. The method of claim 4, wherein said selectively varying one or more relative phases respectively associated with one or more antenna elements further comprises:

selectively switching one or more delay elements respectively associated with the one or more antenna elements.

7. The method of claim 4, wherein said selectively varying one or more relative phases respectively associated with one or more antenna elements comprises:

selectively displacing the one or more antenna elements.

8. The method of claim 1, wherein said adjusting a field of regard of a first-mote directional antenna further comprises:

selectively displacing at least a part of the first-mote directional antenna.

9. The method of claim 8, wherein said selectively displacing at least a part of the first-mote directional antenna further comprises:

selectively adjusting a feed of a horn antenna.

10. The method of claim 1, wherein said adjusting a field of regard of a first-mote directional antenna further comprises:

selectively tuning the first-mote directional antenna.

11. The method of claim 1, wherein said monitoring one or more indicators of a received signal strength of the first-mote directional antenna further comprises:

logging one or more indicators of the received signal strength of the first-mote directional antenna.

12. The method of claim 1, wherein said determining a direction associated with a second mote in response to the monitored one or more indicators of the received signal strength of the first-mote directional antenna further comprises:

selectively varying a reception frequency.

13. The method of claim 12, wherein said selectively varying a reception frequency further comprises:

maintaining a first reception frequency during a first rate of movement.

14. The method of claim 13, further comprising:

maintaining a second reception frequency during a second rate of movement.

15. The method of claim 1, wherein said determining a direction associated with a second mote in response to the monitored one or more indicators of the received signal strength of the first-mote directional antenna further comprises:

determining a substantially maximum signal power associated with a beacon signal; and determining a direction of the field of regard of the first-mote directional antenna associated with the substantially maximum signal power.

16. The method of claim 1, further comprising:

adjusting the field of regard of the first-mote directional antenna to orient toward the determined direction associated with the second mote.

17. A mote method comprising:

adjusting a beam of a second-mote directional antenna, wherein said adjusting a beam of a second-mote directional antenna further comprises:

moving the beam such that the beam of the second-mote directional antenna will likely operably align with a field of regard of a first-mote directional antenna, wherein said moving the beam such that the beam of the second-mote directional antenna will likely operably align with a field of regard of a first-mote directional antenna further comprises:

moving the beam through at least two angles at a quasi-randomly selected rate of movement; and transmitting a signal over the beam of the second-mote directional antenna.

18. The method of claim 17, wherein said adjusting a beam of a second-mote directional antenna further comprises:

selectively forming the beam of the second-mote directional antenna.

19. The method of claim 17, wherein said adjusting a beam of a second-mote directional antenna further comprises:

selectively switching the beam of the second-mote directional antenna.

20. The method of claim 17, wherein said adjusting a beam of a second-mote directional antenna further comprises:

selectively steering the beam of the second-mote directional antenna.

21. The method of claim 17, wherein said adjusting a beam of a second-mote directional antenna further comprises:

selectively adapting the beam of the second-mote directional antenna.

22. The method of claim 17, wherein said moving the beam such that the beam of the second-mote directional antenna will likely operably align with a field of regard of a first-mote directional antenna further comprises:

rotating the beam at a rate of rate of rotation varied by a quasi-random amount from a nominal rate of rotation of the second-mote directional antenna and/or the first-mote directional antenna.

23. The method of claim 17, wherein said moving the beam such that the beam of the second-mote directional antenna will likely operably align with a field of regard of a first-mote directional antenna further comprises:

moving the beam for a quasi-randomly selected period of time.

24. The method of claim 17, wherein said adjusting a beam of a second-mote directional antenna further comprises:

selectively varying one or more relative phases respectively associated with one or more antenna elements.

25. The method of claim 24, wherein said selectively varying one or more relative phases respectively associated with one or more antenna elements further comprises:

selectively varying one or more relative dielectric constants respectively associated with one or more antenna elements.

26. The method of claim 24, wherein said selectively varying one or more relative phases respectively associated with one or more antenna elements further comprises:

selectively switching one or more delay elements respectively associated with one or more antenna elements.

27. The method of claim 24, wherein said selectively varying one or more relative phases respectively associated with one or more antenna elements further comprises:

selectively displacing one or more antenna elements.

28. The method of claim 17, wherein said adjusting a beam of a second-mote directional antenna further comprises:

selectively displacing at least a part of the second-mote directional antenna.

29. The method of claim 28, wherein said selectively displacing at least a part of the second-mote directional antenna further comprises:

selectively adjusting a feed of a horn antenna.

30. The method of claim 17, wherein said adjusting a beam of a second-mote directional antenna further comprises:

selectively tuning the second-mote directional antenna.

31. The method of claim 17, wherein said transmitting a signal over the beam of the second-mote directional antenna further comprises:

selectively varying a transmission frequency.

32. The method of claim 31, wherein said selectively varying a transmission frequency further comprises:

maintaining a first transmission frequency during a first rate of movement.

33. The method of claim 32, further comprising:

maintaining a second transmission frequency during a second rate of movement.

34. The method of claim 17, wherein said transmitting a signal over the beam of the second-mote directional antenna further comprises:

detecting an initiation signal; and initiating at least one of said adjusting a beam of a second-mote directional antenna or said transmitting a signal over the beam of the second-mote directional antenna, in response to said detecting.

35. A mote method comprising:

adjusting a field of regard of a first-mote directional antenna, wherein said adjusting a field of regard of a first-mote directional antenna further comprises:

moving the field of regard such that the field of regard of the first-mote directional antenna will likely operably align with a beam of a second-mote directional antenna, wherein said moving the field of regard such that the field of regard of the first-mote directional antenna will likely operably align with a beam of a second-mote directional antenna further comprises:

rotating the field of regard at a rate of rotation varied by a quasi-random amount from a nominal rate of rotation of the first-mote directional antenna and/or the second-mote directional antenna;

monitoring one or more indicators of a received signal strength of the first-mote directional antenna; and determining a direction associated with a second mote in response to the monitored one or more indicators of the received signal strength of the first-mote directional antenna.

36. A mote method comprising:

adjusting a field of regard of a first-mote directional antenna, wherein said adjusting a field of regard of a first-mote directional antenna further comprises:

moving the field of regard such that the field of regard of the first-mote directional antenna will likely operably align with a beam of a second-mote directional antenna, wherein said moving the field of regard such that the field of regard of the first-mote directional antenna will likely operably align with a beam of a second-mote directional antenna further comprises:

moving the field of regard for a quasi-randomly selected period of time;

monitoring one or more indicators of a received signal strength of the first-mote directional antenna; and determining a direction associated with a second mote in response to the monitored one or more indicators of the received signal strength of the first-mote directional antenna.

37. A mote method comprising:

adjusting a field of regard of a first-mote directional antenna;

monitoring one or more indicators of a received signal strength of the first-mote directional antenna; and determining a direction associated with a second mote in response to the monitored one or more indicators of the received signal strength of the first-mote directional antenna, wherein said determining a direction associated with a second mote in response to the monitored one or more indicators of the received signal strength of the first-mote directional antenna further comprises:

selectively varying a reception frequency, wherein said selectively varying a reception frequency further comprises:

maintaining a first reception frequency during a first rate of movement.

38. The method of claim 37, further comprising:

maintaining a second reception frequency during a second rate of movement.

39. A mote method comprising:

adjusting a beam of a second-mote directional antenna, wherein said adjusting a beam of a second-mote directional antenna further comprises:

moving the beam such that the beam of the second-mote directional antenna will likely operably align with a field of regard of a first-mote directional antenna, wherein said moving the beam such that the beam of the second-mote directional antenna will likely operably align with a field of regard of a first-mote directional antenna further comprises:

rotating the beam at a rate of rate of rotation varied by a quasi-random amount from a nominal rate of rotation of the second-mote directional antenna and/or the first-mote directional antenna; and transmitting a signal over the beam of the second-mote directional antenna.

40. A mote method comprising:

adjusting a beam of a second-mote directional antenna, wherein said adjusting a beam of a second-mote directional antenna further comprises:

moving the beam such that the beam of the second-mote directional antenna will likely operably align with a field of regard of a first-mote directional antenna, wherein said moving the beam such that the beam of the second-mote directional antenna will likely operably align with a field of regard of a first-mote directional antenna further comprises:

moving the beam for a quasi-randomly selected period of time; and transmitting a signal over the beam of the second-mote directional antenna.

41. A mote method comprising:

adjusting a beam of a second-mote directional antenna; and transmitting a signal over the beam of the second-mote directional antenna, wherein said transmitting a signal over the beam of the second-mote directional antenna further comprises:

selectively varying a transmission frequency, wherein said selectively varying a transmission frequency further comprises:

maintaining a first transmission frequency during a first rate of movement.

42. The method of claim 41, further comprising:

maintaining a second transmission frequency during a second rate of movement.

* * * * *

UNITED STATES PATENT AND TRADEMARK OFFICE

CERTIFICATE OF CORRECTION

PATENT NO. : 7,317,898 B2
APPLICATION NO. : 10/814454
DATED : January 8, 2008
INVENTOR(S) : Clarence T. Tegreene It is certified that error appears in the above-identified patent and that said Letters Patent is hereby corrected as shown below:

Column 21, line 20 “rotating the beam at a rate of rate of rotation” should be --rotating the beam at a rate of rotation--

Signed and Sealed this
Nineteenth Day of March, 2013

Teresa Stanek Rea
*Acting Director of the United States Patent and Trademark Office*